(12) United States Patent
Furutani

(10) Patent No.: US 9,441,616 B2
(45) Date of Patent: Sep. 13, 2016

(54) OPTICAL CONDENSER, ROTATIONAL AXIS SETTING METHOD THEREFOR, AND HEAT COLLECTION APPARATUS AND SOLAR POWER GENERATION APPARATUS EQUIPPED WITH OPTICAL CONDENSER

(71) Applicant: MITSUBISHI HEAVY INDUSTRIES, LTD., Tokyo (JP)

(72) Inventor: Akira Furutani, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 202 days.

(21) Appl. No.: 14/380,102

(22) PCT Filed: Feb. 25, 2013

(86) PCT No.: PCT/JP2013/054724
§ 371 (c)(1),
(2) Date: Aug. 21, 2014

(87) PCT Pub. No.: WO2013/012929
PCT Pub. Date: Sep. 6, 2013

(65) Prior Publication Data
US 2015/0027119 A1    Jan. 29, 2015

(30) Foreign Application Priority Data
Feb. 29, 2012   (JP) ................. 2012-043863

(51) Int. Cl.
*F03G 7/00*    (2006.01)
*F03G 6/06*    (2006.01)
(Continued)

(52) U.S. Cl.
CPC .. *F03G 6/06* (2013.01); *F24J 2/07* (2013.01); *F24J 2/1047* (2013.01); *F24J 2/16* (2013.01);
(Continued)

(58) Field of Classification Search
CPC ....... F03G 2006/062; F03G 6/06; F24J 2/07; F24J 2/1047; F24J 2/16; G02B 7/1827; G02B 7/183; Y02E 10/41; Y02E 10/46
USPC .................................................. 126/572, 600
See application file for complete search history.

(56) References Cited

U.S. PATENT DOCUMENTS 4,264,145 A   4/1981   Urruela
4,435,043 A   3/1984   Mertens et al.
(Continued)

FOREIGN PATENT DOCUMENTS

EP   2390747 A2   11/2011
JP   52-084753 A   7/1977
(Continued)

OTHER PUBLICATIONS

International Search Report dated Apr. 9, 2013, issued in corresponding International Application No. PCT/JP2013/054724; w/English Translation. (4 pages).
(Continued)

*Primary Examiner* — Jesse Bogue
(74) *Attorney, Agent, or Firm* — Westerman, Hattori, Daniels & Adrian, LLP

(57) ABSTRACT

Optical axis vectors indicating a direction of an optical axis of a mirror structure that directs the light from the sun at a plurality of times on a predetermined day to a condensed position are obtained for each of the plurality of times. Next, a cone having generatrices along which direction segments of the optical axis vectors for each of the plurality of times extend is determined, and a cone central axis vector indicating a direction of a central axis of the cone is obtained. A first rotational axis of an optical condenser is set to be parallel to the cone central axis vector.

17 Claims, 26 Drawing Sheets

(51) Int. Cl.
*F24J 2/07* (2006.01)
*F24J 2/10* (2006.01)
*F24J 2/16* (2006.01)
*G02B 7/182* (2006.01)
*G02B 7/183* (2006.01)

(52) U.S. Cl.
CPC ............ G02B 7/183 (2013.01); G02B 7/1827 (2013.01); *F03G 2006/062* (2013.01); *Y02E 10/41* (2013.01); *Y02E 10/46* (2013.01)

(56) References Cited

U.S. PATENT DOCUMENTS

| | | | | |
|---|---|---|---|---|
| 2004/0004175 | A1* | 1/2004 | Nakamura | F24J 2/07 250/203.4 |
| 2009/0217921 | A1* | 9/2009 | Gilon | F03G 6/06 126/600 |
| 2010/0195227 | A1* | 8/2010 | Green | F24J 2/38 359/853 |
| 2014/0116419 | A1* | 5/2014 | Hernandez | F03G 6/06 126/601 |
| 2014/0345277 | A1* | 11/2014 | Dang | F03G 6/06 60/641.15 |
| 2015/0000278 | A1* | 1/2015 | Furutani | F24J 2/5427 60/641.15 |
| 2015/0007566 | A1* | 1/2015 | Furutani | F03G 6/00 60/641.15 |
| 2015/0090251 | A1* | 4/2015 | Magaldi | F03G 6/06 126/714 |

FOREIGN PATENT DOCUMENTS

| | | |
|---|---|---|
| JP | 53-4947 U | 1/1978 |
| JP | 55-41498 A | 3/1980 |
| JP | 55-096910 A | 7/1980 |
| JP | 58-35359 A | 3/1983 |
| JP | 2001-289734 A | 10/2001 |
| JP | 2002-195824 A | 7/2002 |
| JP | 2002-228272 A | 8/2002 |
| JP | 2004-037037 A | 2/2004 |
| JP | 2004-333003 A | 11/2004 |
| JP | 2007-072278 A | 3/2007 |
| JP | 2009-139761 A | 6/2009 |
| JP | 2009-198120 A | 9/2009 |
| JP | 2010-101462 A | 5/2010 |
| JP | 2011-099629 A | 5/2011 |
| JP | 2011-257088 A | 12/2011 |

OTHER PUBLICATIONS

Written Opinion of the International Searching Authority dated Apr. 9, 2013, issued in corresponding Application No. PCT/JP2013/054724; w/English Translation. (7 pages).

* cited by examiner

100 # OPTICAL CONDENSER, ROTATIONAL AXIS SETTING METHOD THEREFOR, AND HEAT COLLECTION APPARATUS AND SOLAR POWER GENERATION APPARATUS EQUIPPED WITH OPTICAL CONDENSER

TECHNICAL FIELD

The present invention relates to an optical condenser that reflects sunlight with a mirror to condense the sunlight onto a predetermined condensed position, a rotational axis setting method therefor, and a heat collection apparatus and a solar power generation apparatus equipped with the optical condenser.

Priority is claimed on Japanese Patent Application No. 2012-043863, filed Feb. 29, 2012, the content of which is incorporated herein by reference.

BACKGROUND ART

In recent years, apparatuses using heat energy obtained by condensing sunlight onto a predetermined position as environment-friendly clean energy have been briskly developed.

As an optical condenser that condenses sunlight onto a predetermined position, for example, there is an apparatus described in the following PTL 1. This optical condenser includes a mirror and a driving device that turns the mirror around two rotational axes having mutually different orientations. In this optical condenser, one rotational axis of the two rotational axes is set to be parallel to the earth's axis. That is, in this optical condenser, an equatorial telescope type is adopted as the driving device.

CITATION LIST

Patent Literature

[PTL 1] Japanese Unexamined Patent Application Publication No. 55-96910

SUMMARY OF INVENTION

Technical Problem

In the optical condenser described in the above PTL 1, when the sun is simply tracked, the mirror may be turned around the rotational axis parallel to the earth's axis. However, practically, it is necessary to direct the light from the sun making the diurnal motion to a fixed condensed position. Therefore, in order to respond to the diurnal motion of the sun, it is necessary to turn the mirror around the rotational axis parallel to the earth's axis and also turn the mirror around the remaining rotational axis.

That is, in the optical condenser described in the above PTL 1, it is necessary to turn the mirror around the two rotational axes in order to respond to the diurnal motion of the sun. Therefore, there is a problem that not only does a control system of the driving device become complicated but also the energy consumption for driving the mirror is large.

Thus, an object of the invention is to provide an optical condenser, a rotational axis setting method therefor, and a heat collection apparatus and a solar power generation apparatus equipped with the optical condenser in which a control system of a driving device can be simplified and the energy consumption of the driving device can be suppressed.

Solution to Problem

An optical condenser related to the invention for solving the above problems is an optical condenser that includes a mirror structure having one or more mirrors and reflects sunlight with the mirrors of the mirror structure to condense the sunlight onto a predetermined condensed position. The optical condenser includes a first driving part that turns the mirrors with a first rotational axis as a center, and a second driving part that turns the mirrors with a second rotational axis perpendicular to the first rotational axis as a center. The first rotational axis is set to be parallel to a central axis of a cone drawn by a track of an optical axis of the mirror structure that directs the light from the sun making a diurnal motion to the condensed position.

The direction of the optical axis of the mirror structure that directs the light from the sun at a certain time to the fixed condensed position is a direction in which an angle formed between an imaginary line connecting the sun and the principal point (a point passing through the optical axis among points on the reflecting surfaces of the mirrors or extending surfaces of the reflecting surfaces) of the mirror structure and an imaginary line connecting the principal point of the mirror structure and the condensed position is bisected. The track of the optical axis accompanying the diurnal motion of the sun draws a side peripheral surface of a certain cone. For this reason, if the first rotational axis is set to be parallel to the central axis of the cone and if the mirror structure is first turned with the second rotational axis as a center so that the sunlight reflected by the mirror structure is radiated to the condensed position, the light of the sun making the diurnal motion can be radiated to the fixed condensed position, basically and simply by turning the mirror structure with the first rotational axis as a center from then.

Hence, in the optical condenser, a control system of the driving device can be simplified, and the energy consumption of the driving device can be suppressed.

Here, in the optical condenser, reflecting surfaces of the one or more mirrors of the mirror structure may form one symmetrical plane of revolution, and a symmetrical axis of revolution of the symmetrical plane of revolution may constitute the optical axis of the mirror structure.

Additionally, the optical condenser may further include an elevation angle changing part that changes an angle of the first rotational axis with respect to a horizontal surface.

In a heat collection apparatus, a plurality of the optical condensers are often provided. In this case, relative positions with respect to condensed positions vary for each of the optical condensers, and it is necessary to change the angle of the first rotational axis with respect to the horizontal surface. Since the optical condenser has the elevation angle changing part, when a plurality of the optical condensers are provided, the angle of the first rotary shaft with respect to the horizontal surface can be changed for each of the optical condensers.

Additionally, in the optical condenser having the elevation angle changing part, an angle range of the mirrors that are turned with the second rotational axis as a center in the second driving part may be within a predetermined angle range on the basis of the first rotational axis, and the elevation angle changing part may change the angle of the first rotational axis with respect to the horizontal surface between a downward state where one side of the first rotational axis is made equal to or lower than the other side on the basis of the second rotational axis and an upward state where the one side is made higher than the other side.

In the optical condenser, even if the angle range of the mirrors that are turned with the second rotational axis as a center is a limited range, an angle range to be used can be included within the angle range of the mirrors that are turned with the second rotational axis as a center.

A heat collection apparatus related to the invention for solving the above problems includes the optical condenser; and a heat receiver that heats a medium by sunlight condensed by the optical condenser.

A solar power generation apparatus related to the invention for solving the above problems includes the optical condenser; a heat receiver that heats a medium from sunlight condensed by the optical condenser; a turbine that is driven by the medium heated by the heat receiver; and a generator that generates electricity through the driving of the turbine.

A rotational axis setting method related to the invention for solving the above problems is a rotational axis setting method in an optical condenser including a mirror structure having one or more mirrors and a driving device that turns the mirror structure around a rotational axis to direct sunlight reflected by the mirrors of the mirror structure to a predetermined condensed position. The rotational axis setting method includes a data acquisition step of acquiring global position data of the mirror structure, global position data of the condensed position, and solar position data based on the position of the mirror structure for each of a plurality of times on a predetermined day in one year; an optical axis vector calculating step of obtaining optical axis vectors indicating a direction of an optical axis of the mirror structure that directs the light from the sun at the plurality of times on the predetermined day to the condensed position for each of the plurality of times; a cone central axis vector calculating step of determining a cone having generatrices along which direction segments of the optical axis vectors for each of the plurality of times extend, and obtaining a cone central axis vector indicating a direction of a central axis of the cone; and a rotational axis setting step of setting the rotational axis to be parallel to the cone central axis vector.

In the setting method, similar to the above optical condenser, if the sunlight reflected by the mirror structure is first made to be radiated to the condensed position, the light of the sun making the diurnal motion can be radiated to the fixed condensed position, basically and simply by turning the mirror structure with one rotational axis as a center from then. Hence, if the rotational axis is set by the setting method, the control of the driving device can be simplified, and the energy consumption of the driving device can be suppressed.

Here, in the rotational axis setting method, the driving device may include a first driving part that turns the mirrors with a first rotational axis as the rotational axis as a center, and a second driving part that turns the mirrors with a second rotational axis perpendicular to the first rotational axis as a center. The setting method may further include a step of changing a turning angle of the mirrors centered on the second rotational axis so as to correspond to a change in an elevation angle of the sun accompanying a diurnal change.

In the setting method, it is possible to respond to a change in the elevation angle of the sun accompanying a seasonal change.

Additionally, in the rotational axis setting method, the rotational axis setting step may include an optical condenser installation step of installing the optical condenser so that the mirror structure is located at a position indicated by the position data of the mirror structure acquired in the data acquisition step and the orientation of the first rotational axis becomes the orientation indicated by the cone central axis vector; and a first rotary shaft angle setting step of setting the first rotational axis so that the angle of the first rotational axis with respect to the horizontal surface becomes the angle of the cone central axis vector with respect to the horizontal surface.

In this case, an angle range of the mirrors that are turned with the second rotational axis as a center in the second driving part may be within a predetermined angle range on the basis of the first rotational axis. In the first rotary shaft angle setting step, the first rotational axis may be set in a state where the predetermined angle range based on the first rotational axis is able to include a predetermined angle range where the mirrors are turned with the second rotational axis as a center, out of a downward state where the angle of one side of the first rotational axis with respect to the horizontal surface on the basis of the second rotational axis becomes the angle of the cone central axis vector with respect to the horizontal surface and the one side of the first rotational axis is made equal to or lower than the other side, and an upward state where the angle of the other side of the first rotational axis with respect to the horizontal surface becomes the angle of the cone central axis vector with respect to the horizontal surface and the one side of the first rotational axis is made higher than the other side. In the optical condenser installation step, the optical condenser may be installed so that the orientation of the one side of the first rotational axis with respect to the other side when the first rotational axis is set to the downward state in the first rotary shaft angle setting step, and the orientation of the one side of the first rotational axis with respect to the other side when the first rotational axis is set to the upward state become reverse orientations.

In the setting method, even if the angle range of the mirrors that are turned with the second rotational axis as a center is a limited range, an angle range to be used can be included within the angle range of the mirrors that are turned with the second rotational axis as a center.

Additionally, an optical condenser related to the invention is an optical condenser that includes a mirror structure having one or more mirrors and reflects sunlight with the mirrors of the mirror structure to condense the sunlight onto a predetermined condensed position. The optical condenser includes a first driving part that turns the mirrors with a first rotational axis as a center, a second driving part that turns the mirrors with a second rotational axis perpendicular to the first rotational axis as a center, and an elevation angle changing part that changes an angle of the first rotational axis with respect to the horizontal surface. An angle range of the mirrors that are turned with the second rotational axis as a center in the second driving part is within a predetermined angle range on the basis of the first rotational axis. The elevation angle changing part changes the angle of the first rotational axis between a downward state where one side of the first rotational axis is made equal to or lower than the other side on the basis of the second rotational axis and an upward state where the one side is made higher than the other side.

In the optical condenser, even if the angle range of the mirrors that are turned with the second rotational axis as a center is a limited range, an angle range to be used can be included within the angle range of the mirrors that are turned with the second rotational axis as a center.

Advantageous Effects of Invention

In the invention, if the sunlight reflected by the mirror structure is first made to be radiated to the condensed position, the light of the sun making the diurnal motion can be radiated to the fixed condensed position, basically and simply by turning the mirror structure with one rotational axis as a center from then.

Hence, according to the invention, the control system of the driving device can be simplified, and the energy consumption of the driving device can be suppressed.

BRIEF DESCRIPTION OF DRAWINGS

FIG. 7(a) is a back view of the mirror structure, FIG. 7(b) is a bottom plan view of the mirror structure, and FIG. 7(c) is a sectional side view of the mirror structure.

DESCRIPTION OF EMBODIMENTS

Hereinafter, an embodiment of a heat collection apparatus equipped with an optical condenser related to the invention will be described in detail with reference to the drawings.

Figure 1:
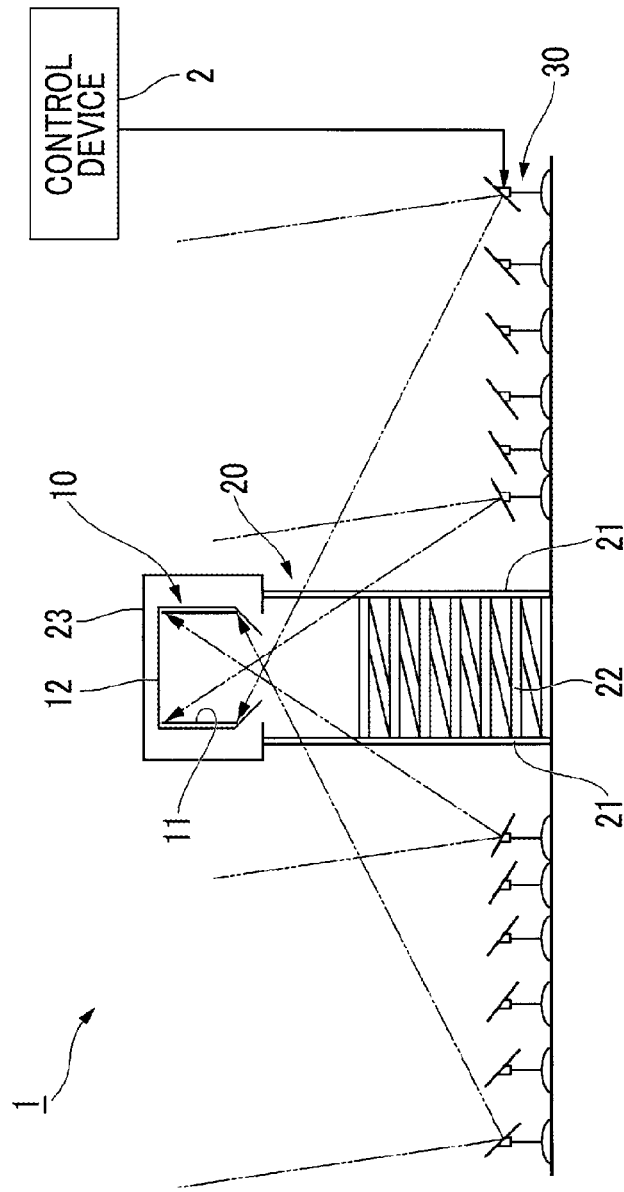
FIG. 1 is an explanatory view showing the configuration of a heat collection apparatus in an embodiment related to the invention.

A heat collection apparatus 1 of the present embodiment, as shown in FIG. 1, includes a heat receiver 10 to which sunlight is radiated, a tower facility 20 to which the heat receiver 10 is fixed on an upper part, a plurality of heliostats 30 as optical condensers that reflect sunlight with a mirror and radiate the sunlight to the heat receiver 10, and a control device 2 that controls the plurality of heliostats 30.

the heat receiver 10 has a heat receiving part 11 to which sunlight is radiated, and a casing 12 that covers the heat receiving part 11. A working fluid, such as water or air, is supplied into the heat receiving part 11, and the working fluid is heated with the heat from the sunlight. When the working fluid is air, the heat collection apparatus 1 can constitute a solar power generation apparatus by further including a gas turbine that is driven with heated air and a generator that generates electricity with the driving of the gas turbine. In addition, in this example, the heat energy from the heat receiver 10 is utilized for generation of electrical energy, this heat energy may be utilized for generation of steam, and this steam may be utilized for generation of electrical energy.

Figure 2:
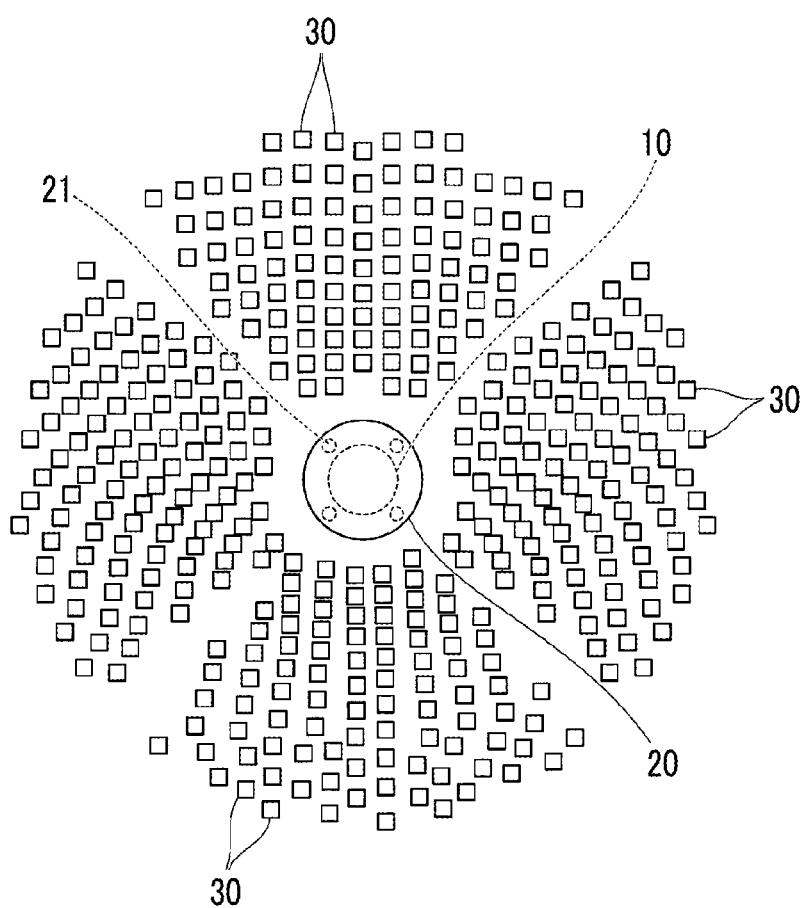
FIG. 2 is a plan view of the heat collection apparatus in the embodiment related to the invention.

As shown in FIG. 2, the plurality of heliostats 30 are dotted within a ring-shaped region with the tower facility 20 as a center. In other words, the plurality of heliostats 30 are arranged 360° in a circumferential direction with the tower facility 20 as a center, and the plurality of heliostats are also arranged in far and near directions on the basis of the tower facility 20. In addition, here, the plurality of heliostats 30 are arranged within the ring-shaped region with the tower facility 20 as a center. However, the plurality of heliostats 30 may be arranged within a fan-shaped region or a rectangular region that has the tower facility 20 as a pivot.

The tower facility 20, as shown in FIG. 1, has four posts 21 that extend in a vertical direction, a plurality of beams 22 that connect the four posts 21 to each other, and a storage room 23 that stores the heat receiver 10. The posts 21 and the beams 22 of the tower facility 20 are arranged so as not to be present on a light path of the sunlight that is reflected with the mirrors of the heliostats 30 and is directed to the heat receiver 10.

The heliostat 30, as shown in FIGS. 3 to 6, includes a mirror structure 31 having a mirror 32 that reflects sunlight, a driving device 40 that directs the mirror 32 of the mirror structure 31 in a target direction, and a supporting base 80 that supports these. In addition, the driving device 40 is a device that turns the mirror structure 31 with a first rotational axis A1 and a second rotational axis A2 orthogonal to each other as centers, respectively, as will be described below in more detail.

Figure 7:
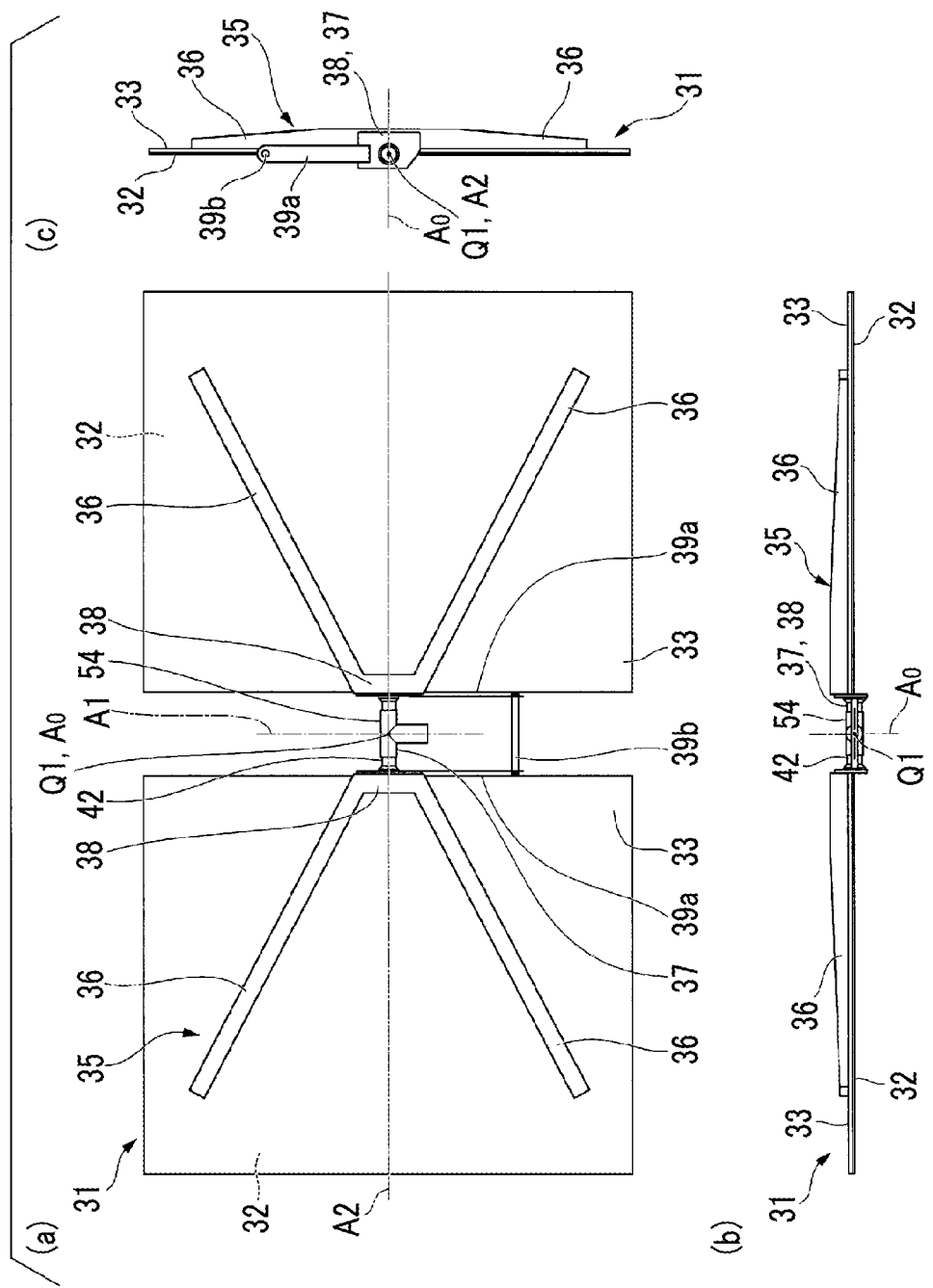
FIG. 7 is a view showing a mirror structure in the embodiment related to the invention.

The mirror structure 31, as shown in FIG. 7, has two mirrors 32, a back reinforcing plate 33 adhered to a back face of the respective mirrors 32, and a supporting frame 35 that supports a back face of the back reinforcing plate 33.

Figure 8:
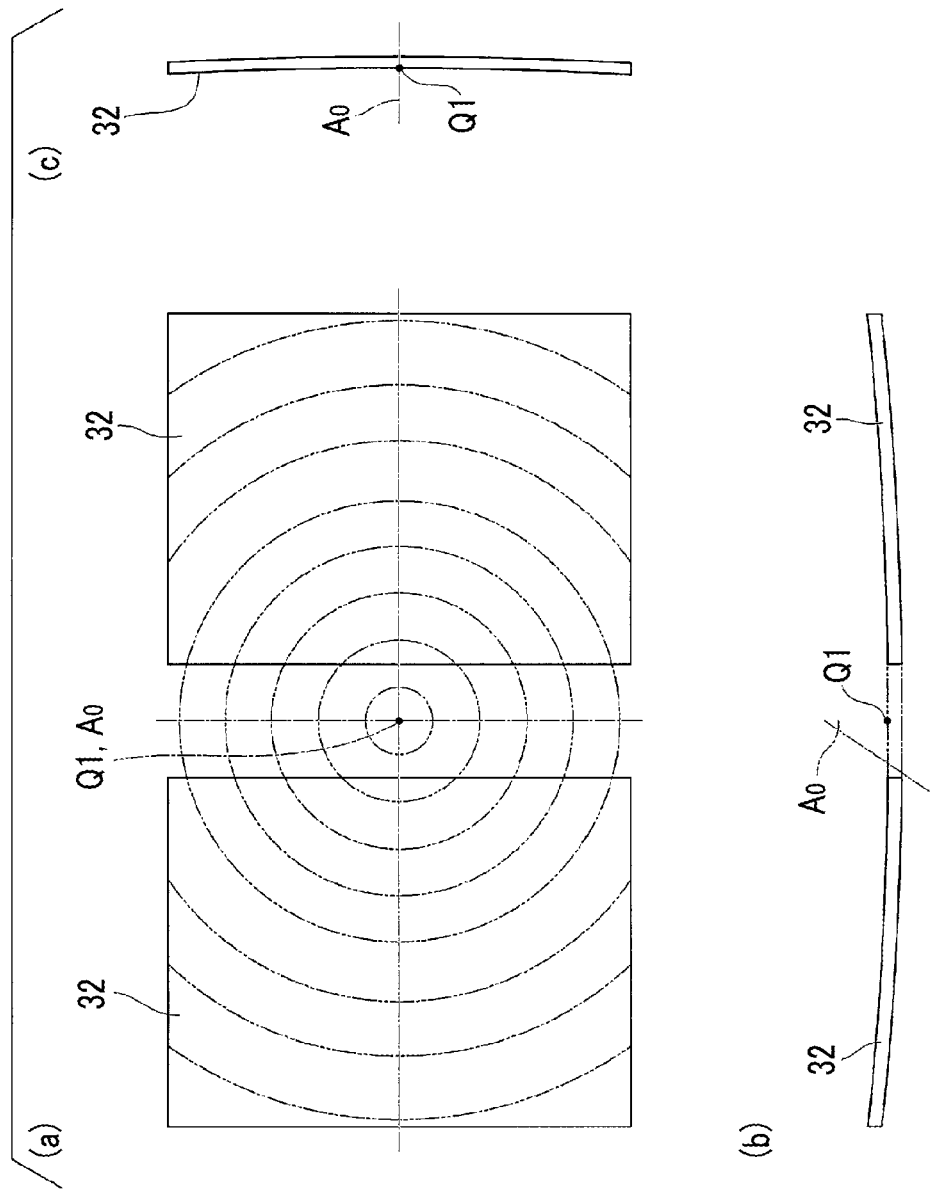
FIG. 8 is an explanatory view of a mirror in the embodiment related to the invention.

The two mirrors 32, as shown in FIG. 8, have the same size and form the same oblong plate shape. In the mirror structure 31 of the present embodiment, the reflecting surfaces of the two mirrors 32 form one symmetrical plane of revolution, specifically, a paraboloid of revolution. An apex of the paraboloid of revolution is located at a midpoint of the two mirrors 32. Hereinafter, in the present embodiment, the apex of the paraboloid of revolution is referred to as a principal point Q1 of the mirror structure 31, and an axis passing through the principal point Q1 and extending in a normal direction with respect to a reflecting surface, that is, a symmetrical axis of revolution of the symmetrical plane of revolution is referred to as an optical axis Ao of the mirror structure 31.

As mentioned above, the back reinforcing plates 33 are adhered to the whole back faces of the two mirrors 32, respectively. The back reinforcing plate 33 is formed of a thin steel plate, a thin aluminum alloy plate, a resin plate, or the like, and is molded so as to form a concavo-convex shape in its thickness direction. The back reinforcing plate 33 is adhered to the back face of the mirror 32 via an adhesive at top portions of convex portions of the concavo-convex shape. It is preferable that the adhesive that adheres at least portions between the mirror 32 and the back reinforcing plate 33 to each other be, for example, an elastic silicon-based or denatured silicon-based adhesive having elasticity, in order to absorb a thermal expansion difference caused by a difference between the coefficient of thermal expansion of the mirror 32 and the coefficient of thermal expansion of the back reinforcing plate 33. Meanwhile, in the back reinforcing plate 33, a supporting frame 35 is joined to portions that are relatively recessed with respect to the convex portions by welding or adhesion.

The supporting frame 35 has a plurality of supporting beam members 36, and a connecting member 37 that connects the plurality of supporting beam members 36 to each other. The cross-sectional shape of the supporting beam member 36 is a groove type or an angular pipe type. The plurality of supporting beam members 36 are joined to the back reinforcing plate 33 so that the longitudinal direction thereof faces a radiation direction from the optical axis Ao of the mirror structure 31. Specifically, in the present embodiment, two supporting beam members 36 are provided with respect to one back reinforcing plate 33. One end portion of each supporting beam member 36 is directed to an optical axis Ao side, the other end portion thereof is directed to a corner side of the back reinforcing plate 33, that is, a corner side of the mirror 32, and two supporting beam members 36 are provided at the back reinforcing plate 33 so as to form a V-shape. In addition, here, two supporting beam members 36 are provided with respect to one back reinforcing plate 33, that is, one mirror 32. However, three or more supporting beam members may be provided from a viewpoint of strength.

The connecting member 37 has a connecting beam 38 that connects two supporting beam members 36 of one back reinforcing plate 33 to each other, a columnar shaft 42 that connects the connecting beam 38 on one back reinforcing plate 33 side and the connecting beam 38 on the other back reinforcing plate 33 side to each other, a T-shaped pipe 54 through which the shaft 42 is inserted, an arm plate 39a that has one end portion fixed to the connecting beam 38 and extends along the edge of the back reinforcing plate 33, and a spacing holding rod 39b that connects an end portion of the arm plate 39a on one back reinforcing plate 33 side and an end portion of the arm plate 39a on the other back reinforcing plate 33 side to each other.

Figure 3:
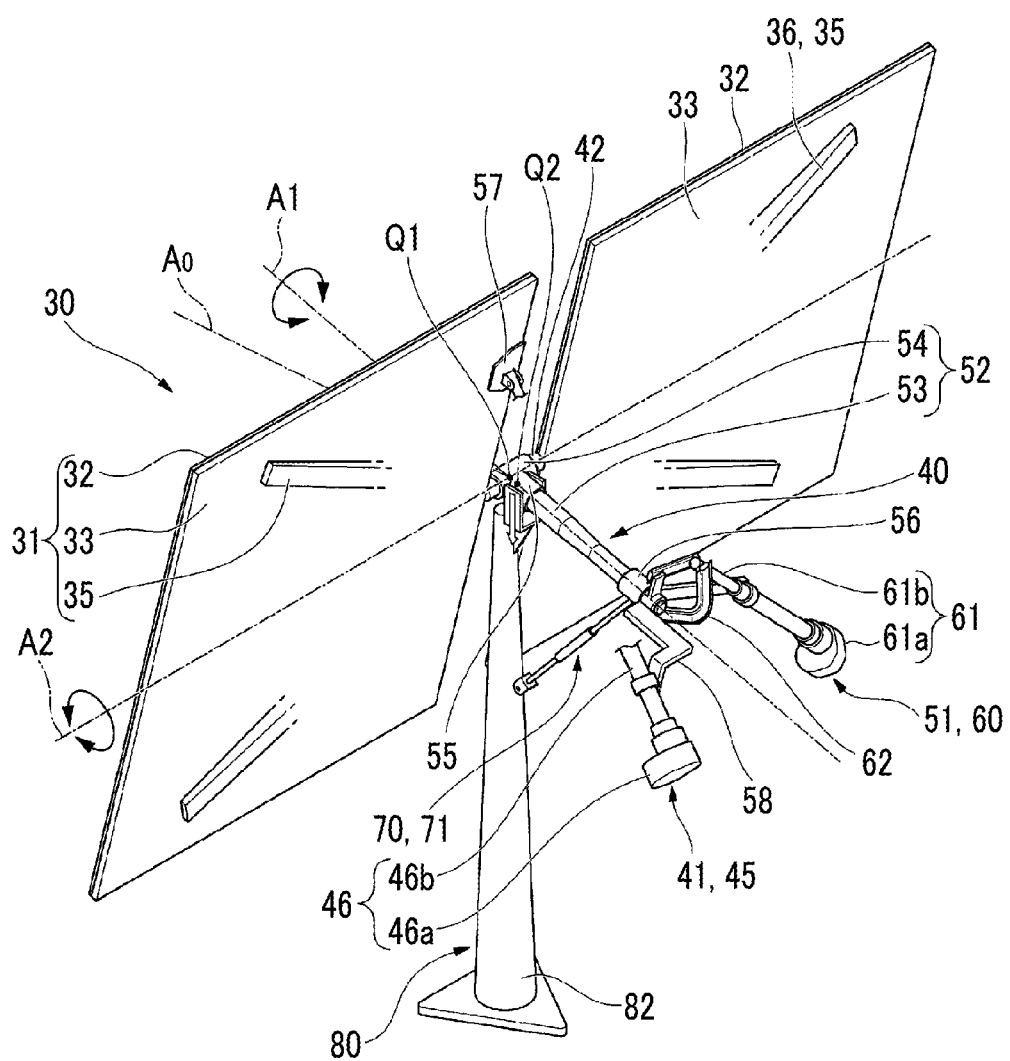
FIG. 3 is a schematic perspective view of a heliostat in the embodiment related to the invention.
Figure 4:
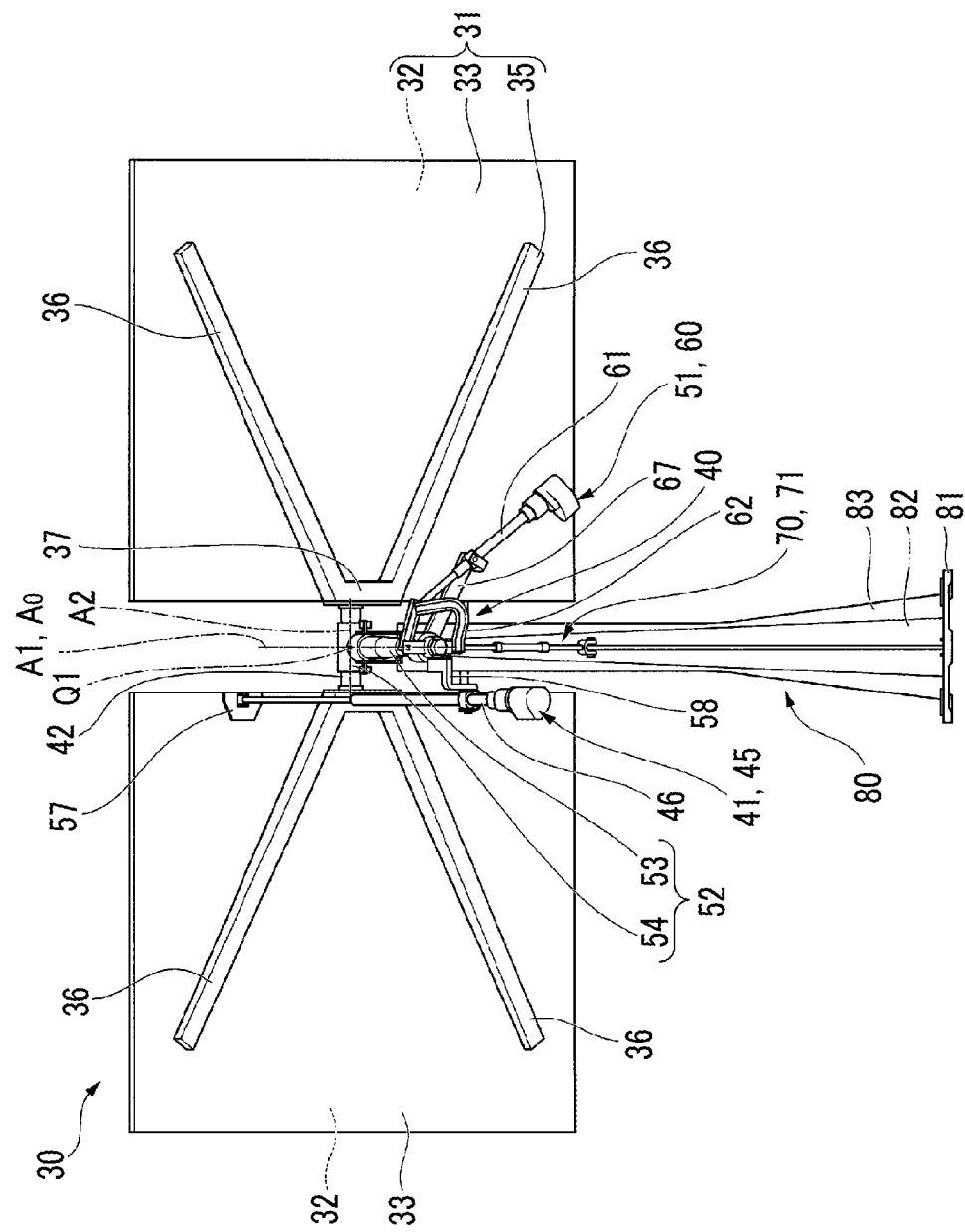
FIG. 4 is a back view of the heliostat in the embodiment related to the invention.
Figure 9:
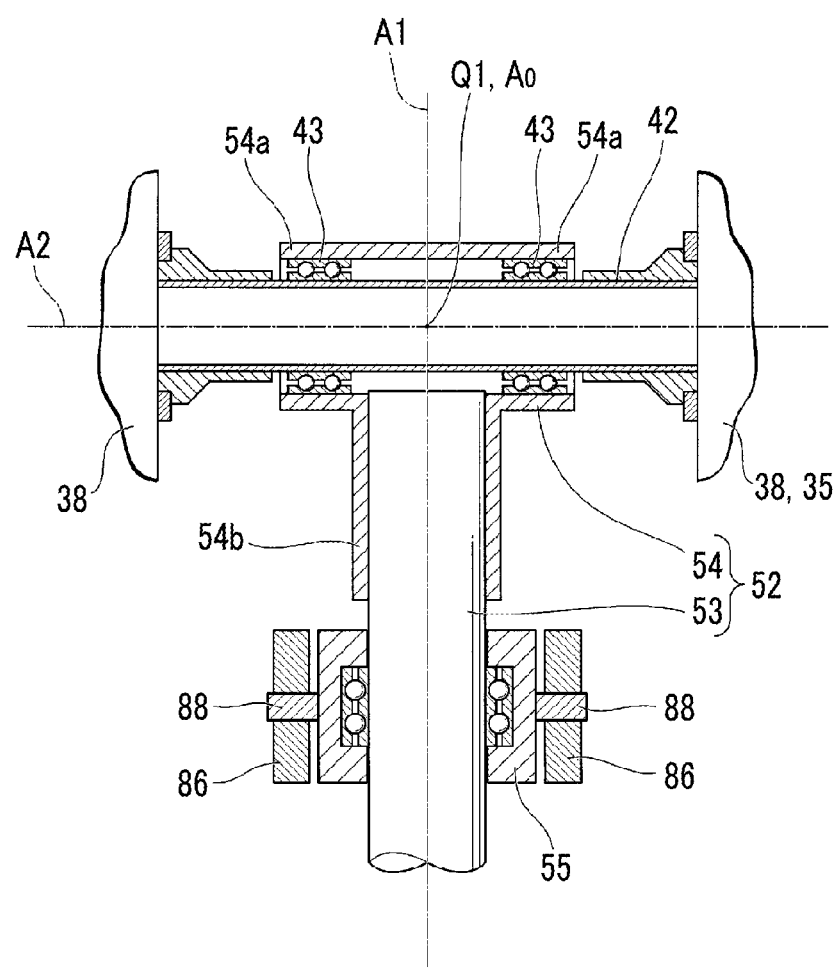
FIG. 9 is a cross-sectional view around respective rotary shafts in the embodiment related to the invention.
Figure 10:
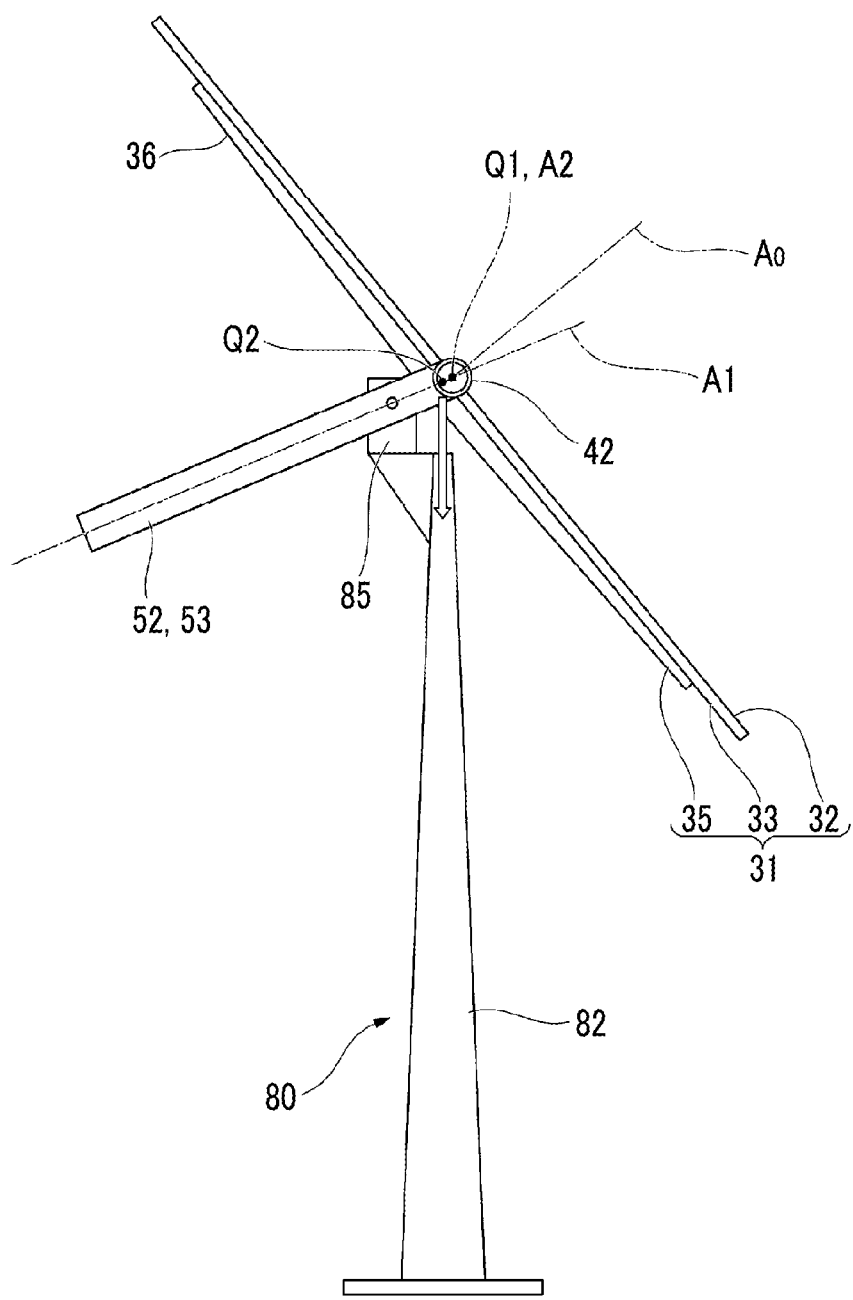
FIG. 10 is an explanatory view showing the correlation among the optical axis, gravity center, and respective rotational axes of the mirror structure in the embodiment related to the invention.

A central axis of the shaft 42 that connects the connecting beams 38 to each other, as shown in FIGS. 3 and 10, is orthogonal to the optical axis Ao, and passes through the principal point Q1 that is the apex of the paraboloid of revolution of the mirror structure 31. Additionally, the shaft 42, as shown in FIG. 9, enters a portion 54a equivalent to a horizontal line of the T-shaped pipe 54, and is supported by bearings 43 provided inside the T-shaped pipe 54 so as to be rotatable around its own central axis. In the present embodiment, the shaft 42 forms a second rotary shaft, and the central axis of the shaft 42 forms a second rotational axis A2. Hence, the shaft 42 is hereinafter referred to as the second rotary shaft 42.

Each arm plate 39a, as shown in FIG. 7, extends in a direction perpendicular to the second rotary shaft 42, and has one end portion fixed to the connecting beam 38 as mentioned above. The other end portion of one arm plate 39a of the two arm plates 39a and the other end portion of the other arm plate 39a are connected to each other by the spacing holding rod 39b, as mentioned above. The spacing holding rod 39b extends in a direction parallel to the second rotary shaft 42.

In the present embodiment, as mentioned above, the shaft of the connecting member 37 forms the second rotary shaft 42, and the central axis of the shaft forms the second rotational axis A2. Additionally, the first rotational axis A1 orthogonal to the second rotational axis A2, as shown in FIGS. 3 and 10, also passes through the principal point Q1 that is the apex of the paraboloid of the mirror structure 31, similar to the second rotational axis A2. That is, in the present embodiment, an intersection point between the first rotational axis A1 and the second rotational axis A2 and the principal point Q1 of the mirror structure 31 coincide with each other.

The driving device 40, as shown in FIGS. 3 to 6, has a first driving part 51 that turns the respective mirrors 32 around the first rotational axis A1, a second driving part 41 that turns the respective mirrors 32 around the second rotational axis A2, and an elevation angle changing part 70 that changes the angle of the first rotary shaft with respect to the horizontal surface.

The second driving part 41 has the aforementioned second rotary shaft 42 having the second rotational axis A2 as a central axis, the aforementioned bearing 43 (FIG. 9) that rotatably supports the second rotary shaft 42 around the second rotational axis A2, and a second drive mechanism 45 that turns the respective mirrors 32 with the second rotational axis A2 as a center.

The second drive mechanism 45 includes a second linear actuator 46. The second linear actuator 46 has a rod cover 46a, and a rod 46b that is linearly driven with respect to the rod cover 46a. The second linear actuator 46 is arranged so that the linear direction of the rod 46b becomes perpendicular to the second rotational axis A2 at a position apart in a radiation direction from the second rotary shaft 42. A tip portion of the rod 46b is pin-connected to a receiving seat 57 provided at the mirror structure 31. The receiving seat 57 is provided at a position apart in the radiation direction from the second rotational axis A2, on the back face of one back reinforcing plate 33 of the mirror structure 31.

The first driving part 51 has a first rotary shaft 52 that is orthogonal to the second rotational axis A2 and has the first rotational axis A1 passing through the principal point Q1 as a central axis, two bearings 55 and 56 that rotatably support the first rotary shaft 52 with the first rotational axis A1 as a center, and a first drive mechanism 60 that turns the respective mirrors 32 around the first rotational axis A1.

The first rotary shaft 52 has a first rotary shaft body 53 that has the first rotational axis A1 as a central axis, and the T-shaped pipe 54 that is a portion of the connecting member 37 in the mirror structure 31. The second rotary shaft 42 enters the portion 54a equivalent to the horizontal line of the T-shaped pipe 54 as mentioned above with reference to FIG. 9, and is supported by the bearing 43 provided inside the T-shaped pipe 54 so as to be rotatable around the second rotational axis A2. Additionally, one end portion of the first rotary shaft body 53 is fitted into a portion 54b equivalent to a vertical line of the T-shaped pipe 54, and the first rotary shaft body 53 is fixed thereto. That is, the T-shaped pipe 54 serves as a shaft connecting member that connects the second rotary shaft 42 and the first rotary shaft body 53 to each other.

In this way, in the present embodiment, the shaft 42 and the T-shaped pipe 54 of the connecting member 37 that are constituent elements of the mirror structure 31 are also constituent elements of the driving device 40.

One side of the first rotary shaft body 53, that is, a position distant from the T-shaped pipe 54, is supported by a rear bearing 56 that is one of the aforementioned two bearings 55 and 56. Additionally, the other side of the first rotary shaft body 53, that is, a position near the T-shaped pipe 54, is supported by a front bearing 55 that is the remaining one of the aforementioned two bearings 55 and 56. Both the front bearing 55 and the rear bearing 56 are attached to the supporting base 80 or a member extending from the supporting base 80, as will be described below.

A second actuator supporting beam 58 is provided at an end farther than the rear bearing 56, on one side of the first rotary shaft body 53. The rod cover 46a of the second linear actuator 46 is pin-connected to the end portion of the second actuator supporting beam 58. For this reason, in the second linear actuator 46, the second linear actuator 46 is also integrally turned with the first rotational axis A1 as a center together with the first rotary shaft 52 if the first rotary shaft 52 rotates with the first rotational axis A1 as a center.

Here, the operation of the second driving part 41 will be described.

As mentioned above, the second linear actuator 46 is arranged so that the linear direction of the rod 46b becomes perpendicular to the second rotational axis A2 at a position apart in the radiation direction from the second rotational axis A2. For this reason, if the rod 46b is linearly driven, the mirror structure 31 connected to the tip portion of the rod 46b is turned around the second rotational axis A2. In this case, the second rotary shaft 42 of the second driving part 41 rotates around the second rotational axis A2.

Figure 25A:
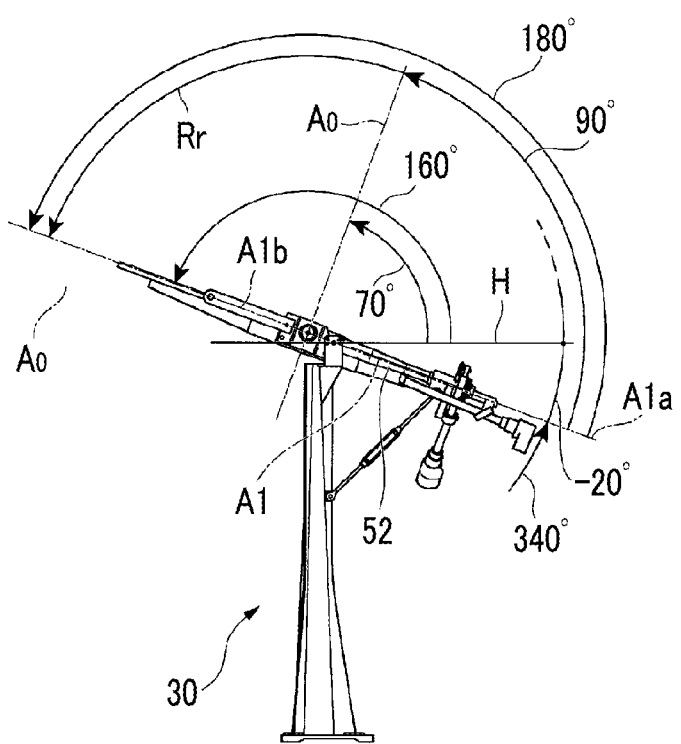
FIG. 25A is an explanatory view showing the rotational angle range of a second rotary shaft in a downward state in the embodiment related to the invention.
Figure 25B:
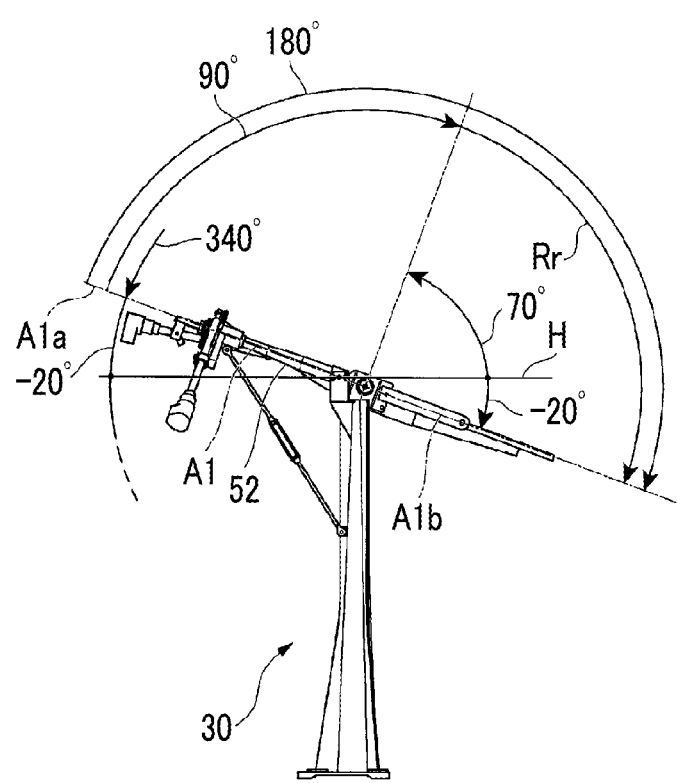
FIG. 25B is an explanatory view showing the rotational angle range of the second rotary shaft in an upward state in the embodiment related to the invention.

In addition, in the case of the present embodiment, the mirror structure 31 is turned with the second rotational axis A2 as a center by the second linear actuator 46 attached to the first rotary shaft 52. Therefore, the turning angle range of the mirror structure 31 around the second rotational axis A2, in other words, the rotational angle range of the second rotary shaft 42, is an angle range based on the first rotary shaft 52, and is less than 180°. Specifically, the rotational angle range of the second rotary shaft 42 of the present embodiment, for example as shown in FIGS. 25A and 25B, is 90° ranging from an angle of about 90° at which the optical axis Ao perpendicular to the second rotary shaft 42 is formed with respect to the first rotary shaft 52 to an angle of about 180° at which the optical axis is formed with respect to the first rotary shaft 52.

The first driving part 51 will be described again. The first drive mechanism 60 of the first driving part 51, as shown in FIGS. 11 to 16, includes a first linear actuator 61 and a four-link mechanism 62.

The four-link mechanism 62 has a first link piece 63, a second link piece 64, a third link piece 65, and a fourth link piece 66 that are connected to each other. A first end portion 63a of the first link piece 63 is fixed to the rear bearing 56, and a first end portion 64a of the second link piece 64 is relatively rotatably connected to the second end portion 63b of the first link piece 63 by a pin. Additionally, a first end portion 65a of the third link piece 65 is relatively rotatably connected to a second end portion 64b of the second link piece 64 by a pin, a first end portion 66a of the fourth link piece 66 is relatively rotatably connected to a second end portion 65b of the third link piece 65 by a pin, and a second end portion 66b of the fourth link piece 66 is fixed to the first rotary shaft 52.

The first linear actuator 61 has a rod cover 61a, and a rod 61b that is linearly driven with respect to the rod cover 61a. The rear bearing 56 is provided with a first actuator supporting beam 67 that extends in the radiation direction with respect to the first rotational axis A1. The rod cover 61a of the first linear actuator 61 is relatively rotatably connected to an end portion of the first actuator supporting beam 67 by a pin.

The second link piece 64 is bent in an L shape, and an intermediate portion between the first end portion 64a and the second end portion 64b of the second link piece 64 is farther from the first rotary shaft 52 than a line segment connecting the first end portion 64a and the second end portion 64b. The distance from the first end portion 66a to the second end portion 66b in the fourth link piece 66, that is, the link length of the fourth link piece 66, is shorter than the distance from the first end portion 64a to the second end portion 64b in the second link piece 64, that is, the link length of the second link piece 64.

Here, the operation of the first driving part 51 will be described.

Figure 11:
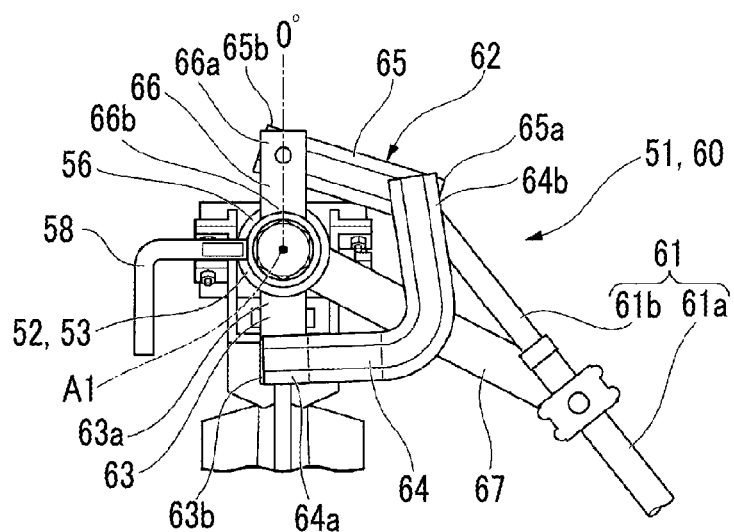
FIG. 11 is a back view (the rotational angle of a first rotary shaft is 0°) of a first drive mechanism in the embodiment related to the invention.
Figure 12:
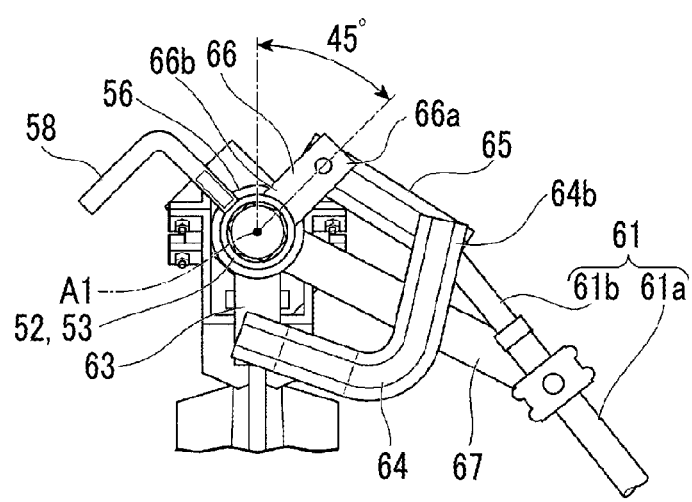
FIG. 12 is a back view (the rotational angle of the first rotary shaft is 45°) of the first drive mechanism in the embodiment related to the invention.

As shown in FIG. 11, the rotational angle of the first rotary shaft 52 when the fourth link piece 66 extends vertically upward from the first rotary shaft 52 is defined as 0°. When the rod 61b of the first linear actuator 61 is linearly driven from this state in a direction in which the rod is retracted into the rod cover 61a, as shown in FIG. 12, the second end portion 64b of the second link piece 64 is displaced together with the linear driving of the rod 61b. As a result, in this drawing, the second link piece rocks in the clockwise direction with the first end portion 64a as a center.

The third link piece 65 connected to the second link piece 64 is moved slightly in the clockwise direction by the rocking of the second link piece 64. If the third link piece 65 is moved slightly in the clockwise direction, the first end portion 66a of the fourth link piece 66 is displaced in the clockwise direction with the movement of the third link piece 65. As a result, the first rotary shaft 52 fixed to the second end portion 66b of the fourth link piece 66 rotates in the clockwise direction around the first rotational axis A1.

Figure 13:
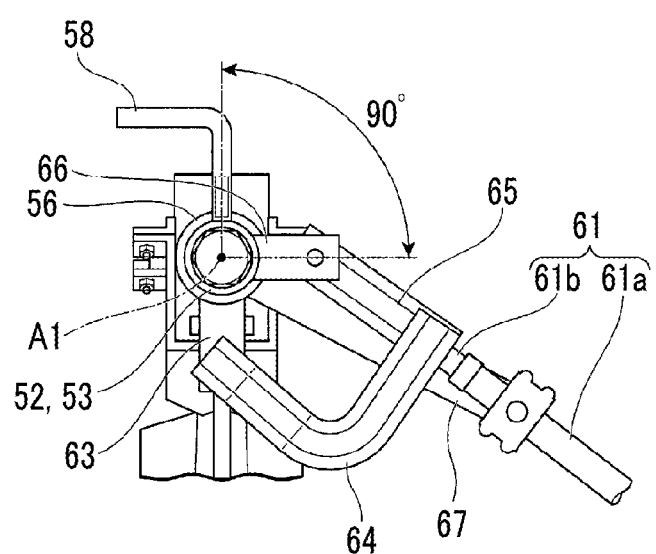
FIG. 13 is a back view (the rotational angle of the first rotary shaft is 90°) of the first drive mechanism in the embodiment related to the invention.

If the rod 61b of the first linear actuator 61 is further linearly driven in the direction in which the rod is retracted into the rod cover 61a, from the state shown in FIG. 12, the first rotary shaft 52 rotates further in the clockwise direction through the same process as the above as shown in FIG. 13. In the present embodiment, the state shown in FIG. 13 is a state where the maximum rotational angle of the first rotary shaft 52 in the clockwise direction is formed. This maximum rotational angle is, for example, 90°.

Figure 14:
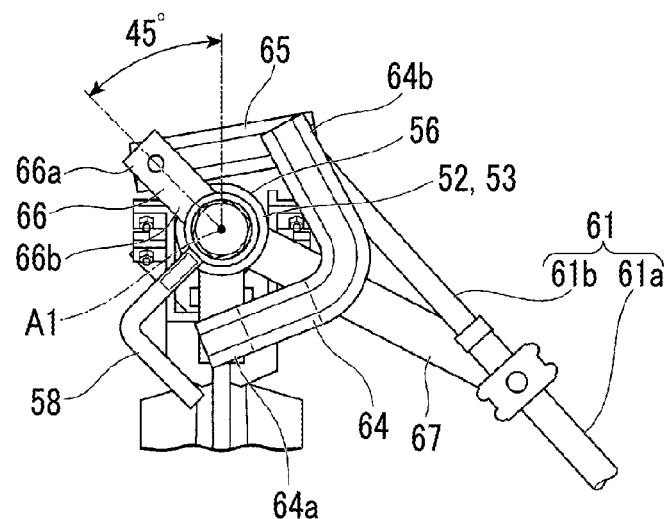
FIG. 14 is a back view (the rotational angle of the first rotary shaft is −45°) of the first drive mechanism in the embodiment related to the invention.

If the rod 61b of the first linear actuator 61 is linearly driven in a direction in which the rod is protruded from the rod cover 61a, from the state shown in FIG. 11, the second link piece 64 is rocked in the counterclockwise direction in this drawing with the first end portion 64a as a center, as shown in FIG. 14. The third link piece 65 connected to the second link piece 64 is moved slightly in the counterclockwise direction by the rocking of the second link piece 64. If the third link piece 65 is moved slightly in the counterclockwise direction, the first end portion 66a of the fourth link piece 66 is displaced in the counterclockwise direction with the movement of the third link piece 65. As a result, the first rotary shaft 52 fixed to the second end portion 66b of the fourth link piece 66 rotates in the counterclockwise direction around the first rotational axis A1.

Figure 15:
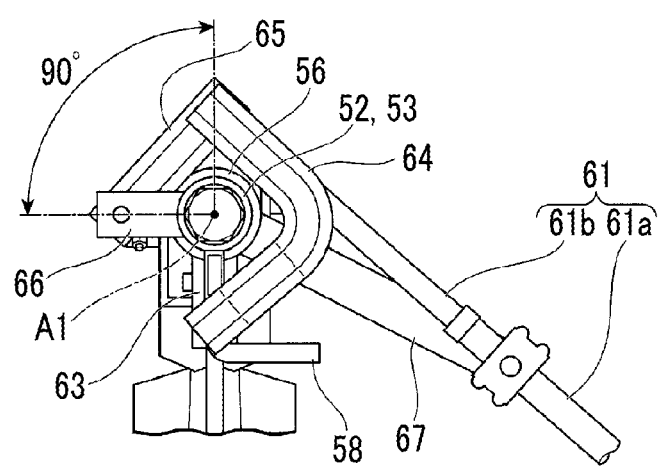
FIG. 15 is a back view (the rotational angle of the first rotary shaft is −90°) of the first drive mechanism in the embodiment related to the invention.
Figure 16:
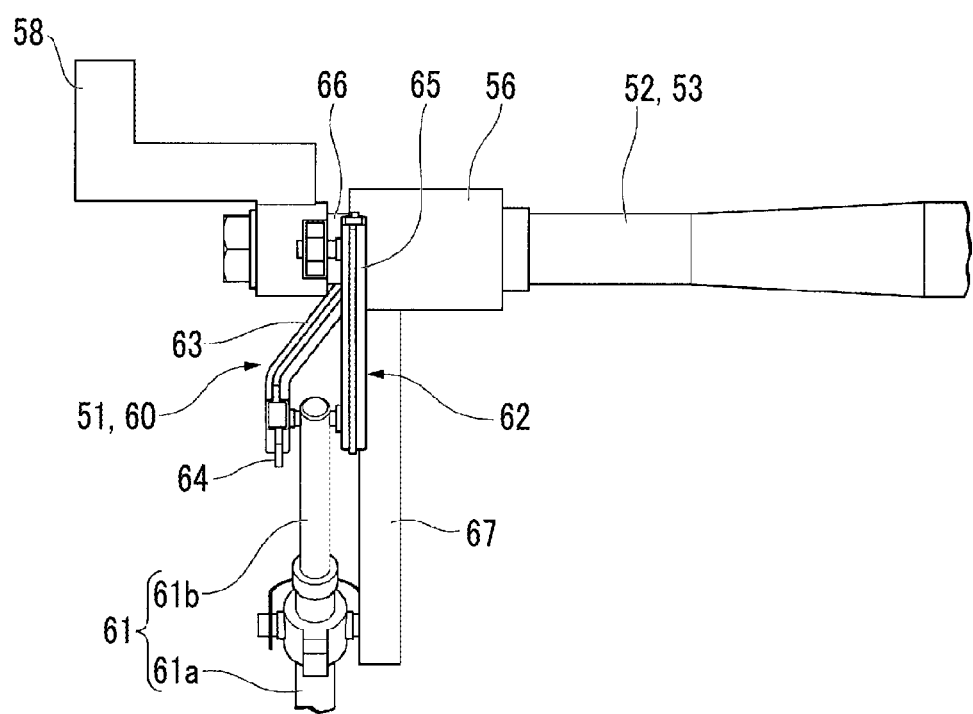
FIG. 16 is a side view of the first drive mechanism in the embodiment related to the invention.

If the rod 61b of the first linear actuator 61 is further linearly driven in the direction in which the rod is protruded from the rod cover 61a, from the state shown in FIG. 14, the first rotary shaft 52 rotates further in the counterclockwise direction through the same process as the above as shown in FIG. 15. In the present embodiment, the state shown in FIG. 15 is a state where the maximum rotational angle of the first rotary shaft 52 in the counterclockwise direction is formed. This maximum rotational angle is, for example, −90°.

As described above, in the present embodiment, the first rotary shaft 52 can be rotated within an angle range of ±90, that is, the angle range of 180°.

Incidentally, in the present embodiment, if a state where the rotational angle of the first rotary shaft 52 shown in FIG. 11 is 0° is defined as a reference state, the fourth link piece 66 inclines at 45° from the reference state when the rotational angle of the first rotary shaft 52 shown in FIG. 12 reaches 45°. However, the second link piece 64 of which second end portion is displaced by the first linear actuator 61 inclines only at 22.5° from the reference state.

Additionally, the fourth link piece 66 inclines at 90° from the reference state when the rotational angle of the first rotary shaft 52 shown in FIG. 13 reaches 90°. However, the second link piece 64 of which second end portion is displaced by the first linear actuator 61 inclines only at 45° from the reference state.

Figure 17:
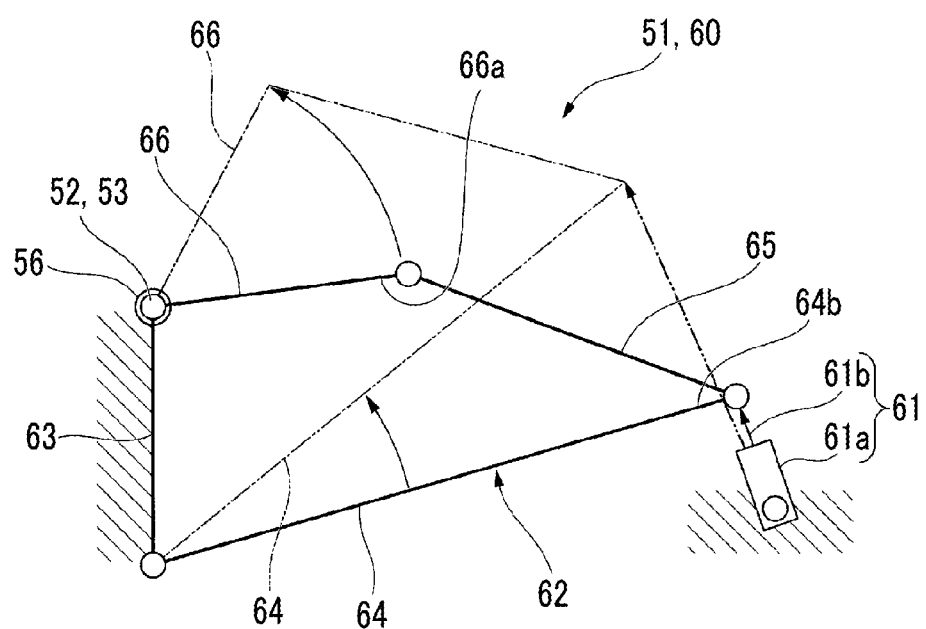
FIG. 17 is an explanatory view showing a four-link mechanism in the embodiment related to the invention.

That is, in the present embodiment, if the second link piece 64 is turned by the first linear actuator 61, the fourth link piece 66 is turned at an angle of twice as much as the turning angle of the second link piece 64. As shown in FIG. 17, this is because, in the present embodiment, even when the amounts of displacement of the end portions (the second end portion 64b in the second link piece 64 and the first end portion 66a in the fourth link piece 66) of the respective link pieces 64 and 66 on the turning side are nearly the same, the link length of the fourth link piece 66 is shorter than the link length of the second link piece 64, and therefore, the turning angle of the fourth link piece 66 becomes greater than the turning angle of the second link piece 64.

Accordingly, in the present embodiment, even if the second link piece 64 is slightly turned by the linear driving of the first linear actuator 61, the fourth link piece 66 can be relatively largely turned, and the rotational angle of the first rotary shaft 52 can be increased. Hence, in the present embodiment, the rotational angle range of the first rotary shaft 52 can be widened.

Additionally, in the present embodiment, as mentioned above, the second link piece 64 is bent in an L shape so that the intermediate portion between the first end portion 64a and the second end portion 64b of the second link piece 64 is farther from the first rotary shaft 52 than the line segment connecting the first end portion 64a and the second end portion 64b. For this reason, in the present embodiment, contact with the first rotary shaft 52 can be avoided, and the turning angle range of the second link piece 64 can be widened. Hence, in the present embodiment, the rotational angle range of the first rotary shaft 52 can also be widened from this viewpoint. Additionally, in the present embodiment, the relationship between axial force and torque and the relationship between a stroke and a rotational angle can be predetermined relationships of one-to-one correspondence.

As described above, in the present embodiment, the first rotary shaft 52 is rotated not by rotating the first rotary shaft 52 with a rotary motor, but by turning a link piece connected to the first rotary shaft 52 with the first linear actuator 61. Thus, an increase in the weight of a rotational driving source of the first rotary shaft 52 can be suppressed while ensuring a large rotary torque. Moreover, in the present embodiment, the first rotary shaft 52 is rotated by turning the link piece with the first linear actuator 61. However, as mentioned above, the rotational angle range of the first rotary shaft 52 can be widened by configuring a special link mechanism.

Figure 5:
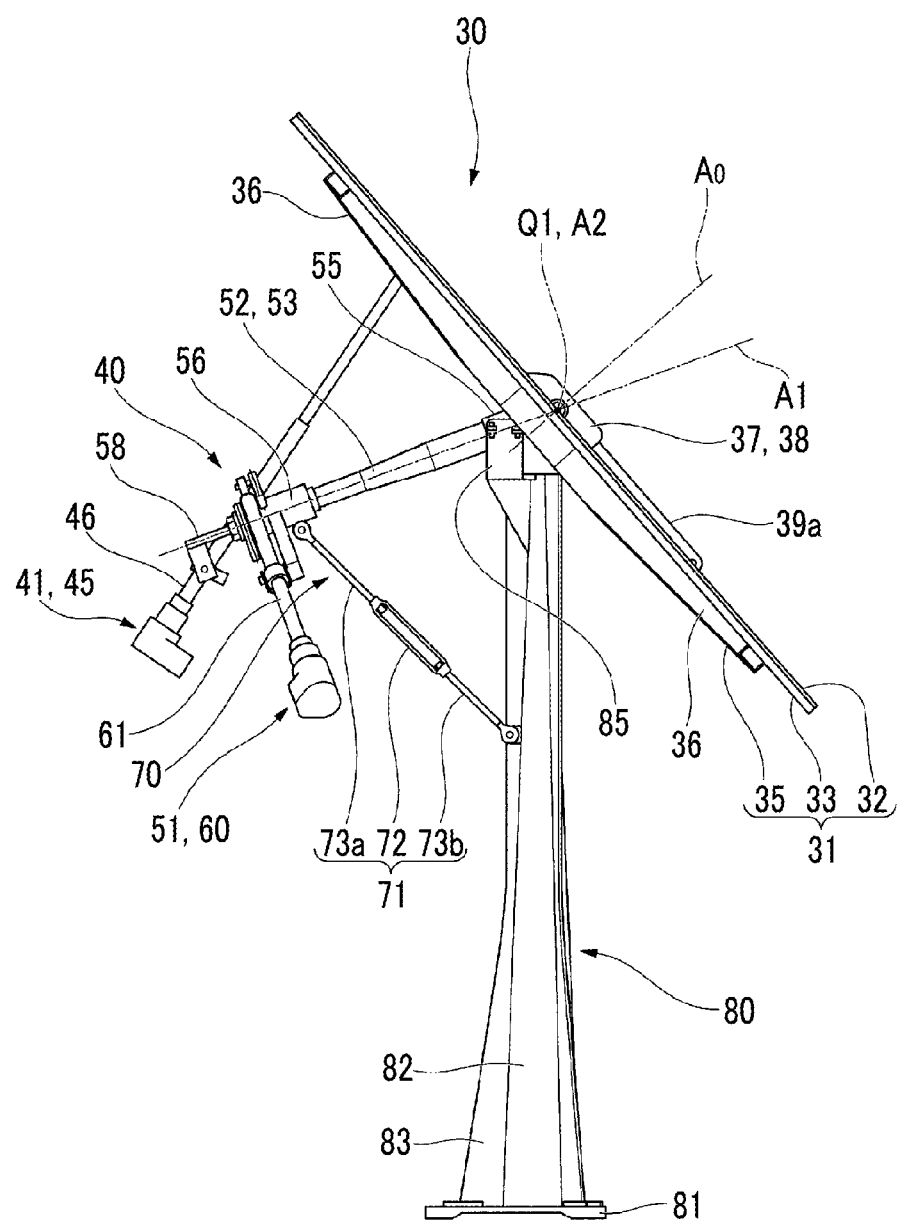
FIG. 5 is a side view of the heliostat in the embodiment related to the invention.
Figure 6:
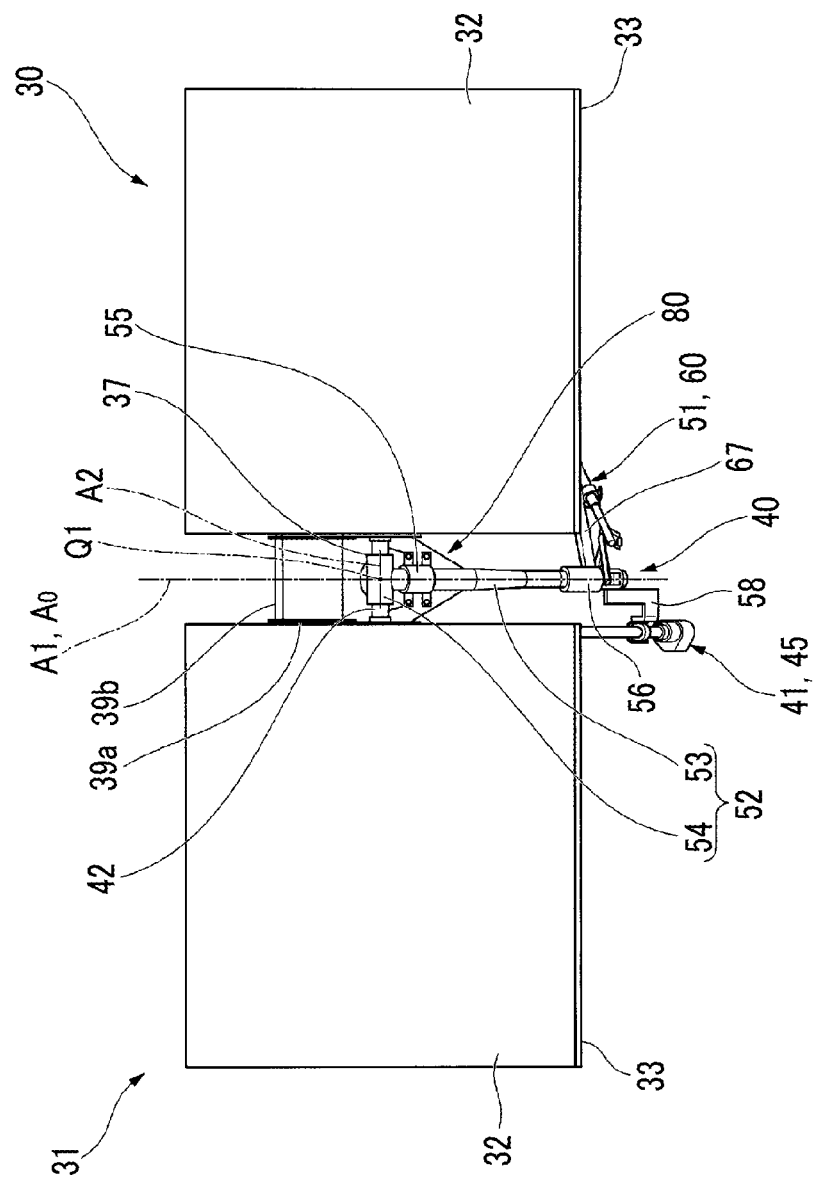
FIG. 6 is a plan view of the heliostat in the embodiment related to the invention.
Figure 18:
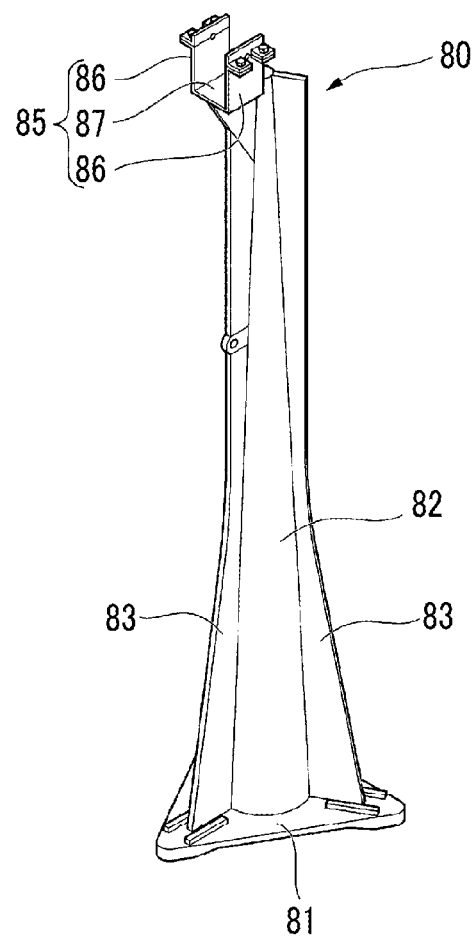
FIG. 18 is a perspective view of a supporting base in the embodiment related to the invention.
Figure 19:
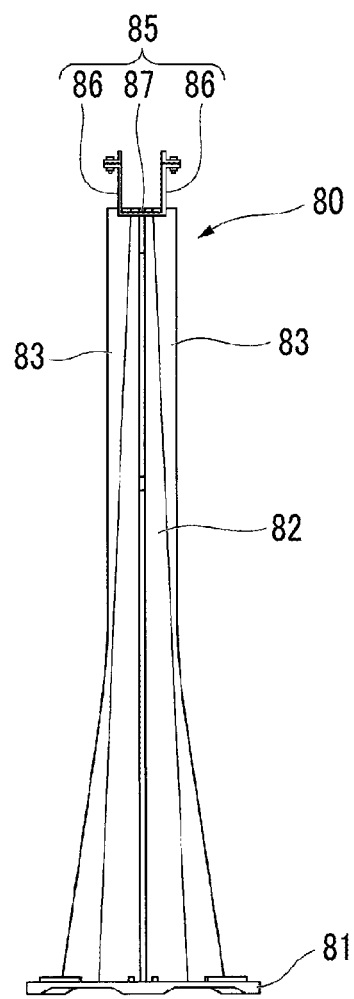
FIG. 19 is a back view of the supporting base in the embodiment related to the invention.

The supporting base 80, as shown in FIGS. 5, 18, and 19, has a base plate 81 that is placed at an installation position of the heliostat 30, a post 82 that is fixed on the base plate 81, a plurality of ribs 83 that are provided along generatrices of the post 82, and a shaft supporting base 85 that supports the first rotary shaft 52.

The post 82 forms a rotary body shape that is formed by rotating an isosceles trapezoid around a central axis of this isosceles trapezoid, that is, forms a truncated cone shape, and a portion equivalent to the bottom of the truncated cone forms the bottom of the post 82. The ribs are provided from a lower end of the post 82 to an upper end thereof along the generatrices of the post 82.

The shaft supporting base 85 has a pair of arm plates 86 that face each other at a distance from each other, and a connecting plate 87 that connects both end portions of the pair of arm plates 86 to each other. The connecting plate 87 of the shaft supporting base 85 is fixed to the post 82. Additionally, as shown in FIG. 9, a front bearing 55 that rotatably supports the first rotary shaft 52 around the first rotational axis A1 is arranged between the pair of arm plates 86. The front bearing 55 is provided with an elevation angle changing shaft 88 that is perpendicular to the first rotational axis A1 and extends in the horizontal direction. The elevation angle changing shaft 88 passes through the arm plates 86 of the shaft supporting base 85, and are supported by the arm plates 86 so as to be rotatable around its own center. Hence, the angle of the first rotary shaft 52 with respect to the horizontal surface can be changed by being turned with the elevation angle changing shaft 88 as a center.

One end portion of a turnbuckle 71 (FIG. 5) is connected to one rear bearing 56 that rotatably supports the first rotary shaft 52 around the first rotational axis A1 by a pin. The other end portion of the turnbuckle 71 is connected to an intermediate portion of the post 82 or the rib 83 of the supporting base 80 in a height direction by a pin. In addition, the turnbuckle 71 has a trunk frame 72 that has female threads formed at both ends thereof, and screw rods 73a and 73b that are screwed into the respective end portions of the trunk frame 72, and the mutual spacing between both the screw rods 73a and 73b can be changed by rotating the trunk frame 72.

The turnbuckle 71 serves to rotate the trunk frame to change the mutual spacing between both the screw rods 73a and 73b to thereby change the angle of the first rotary shaft 52 at a target angle with respect to the horizontal surface while maintaining this angle. Accordingly, in the present embodiment, the elevation angle changing part 70 is constituted by the turnbuckle 71, the elevation angle changing shaft 88 provided at the rear bearing 56, and the shaft supporting base 85 that supports the elevation angle changing shaft 88. In addition, here, the turnbuckle 71 is used for the elevation angle changing part 70 that changes the angle of the first rotary shaft 52 with respect to the horizontal surface. However, the invention is not limited to the turnbuckle 71. For example, those having a linear actuator, a rack and pinion mechanism that converts a rotational motion into a rectilinear motion, and a rotary motor that rotates the pinion of the mechanism may be used.

Incidentally, in the present embodiment, as mentioned above with reference to FIGS. 3 and 10, the intersection point between the first rotational axis A1 and the second rotational axis A2 and the principal point Q1 of the mirror structure 31 coincide with each other. For this reason, in the present embodiment, the principal point Q1 of the mirror structure 31 is not moved even if the mirror structure 31 is turned around the first rotational axis A1 or is turned around the second rotational axis A2. In other words, in the present embodiment, the principal point Q1 of the mirror structure 31 is a fixed point.

In this way, in the present embodiment, the principal point Q1 of the mirror structure 31 is not moved even if the mirror structure 31 is turned around the first rotational axis A1 or is turned around the second rotational axis A2. Therefore, the relative position between the principal point Q1 of the mirror structure 31 and the heat receiving part 11 (heat collection position) of the heat receiver 10 does not change, either.

Hence, in the present embodiment, if the optical axis Ao of the mirror structure 31 is directed to a direction in which an angle formed between an imaginary line connecting the sun at that time and the principal point Q1 of the mirror structure 31 and an imaginary line connecting the principal point Q1 of the mirror structure and a condensed position is bisected, the sunlight reflected by the mirror 32 of the mirror structure 31 can precisely continue being radiated to the heat receiving part 11 of the heat receiver 10.

Additionally, a gravity center Q2 of the mirror structure 31 described above is present at a position slightly shifted from the principal point Q1 of the mirror structure 31 to the supporting beam member 36 side on the basis of the mirror 32, on the optical axis Ao of the mirror structure 31. It should be noted herein that the gravity center Q2 is present within an intersecting portion between the first rotary shaft 52 and the second rotary shaft 42. For this reason, in the present embodiment, even if the mirror structure 31 is turned around the first rotational axis A1 or is turned around the second rotational axis A2, the position of the gravity center Q2 hardly moves, and the moment to turn the mirror structure 31 itself around the first rotational axis A1 or the second rotational axis A2 is hardly produced due to the weight of the mirror structure 31 itself.

Accordingly, in the present embodiment, the driving force for turning the mirror structure 31 can be made small, and even if the rigidity of the first rotary shaft 52 or the second rotary shaft 42, and the rigidity of a supporting structure including bearings that rotatably supports the rotary shafts 52 and 42, or the like are slightly small, the mirror structure 31 can be stably supported.

In this way, in the present embodiment, since the rigidity of the first rotary shaft 52 or the second rotary shaft 42 can be made small, it is also possible to attain miniaturization and weight reduction of these shafts.

Moreover, the gravity center Q2 of the mirror structure 31 of the present embodiment is present on the post 82 that is a main constituent member of the supporting base 80. More precisely, the gravity center is present on an upper surface of the truncated cone-shaped post 82. For this reason, in the present embodiment, even if the mirror structure 31 is turned around each rotational axe A1 or A2, there is almost no overturning moment applied to the base plate 81 side of the post 82 caused by the weight of the mirror structure 31.

Hence, in the present embodiment, miniaturization and weight reduction of the supporting base 80 can be realized. In addition, here, the miniaturization of the supporting base 80 includes making the diameter of the post 82 constituting the supporting base 80 small without making the height of the supporting base 80 low, making the thickness or width of the ribs 83 small, or omitting the ribs 83.

Additionally, in the present embodiment, the first linear actuator 61 and the four-link mechanism 62 as a driving source that rotates the first rotary shaft 52 are greatly apart from the intersection point Q1 between the first rotational axis A1 and the second rotational axis A2. Specifically, the distance from the intersection point Q1 to the first linear actuator 61 and the four-link mechanism 62 is much greater than the distance from the intersection point Q1 to the front bearing 55 that rotatably supports the first rotary shaft 52. Moreover, the second linear actuator 46 as a driving source that rotates the second rotary shaft 42 is also greatly apart from the intersection point Q1 between the first rotational axis A1 and the second rotational axis A2. Specifically, the distance from the intersection point Q1 to the second linear actuator 46 is much greater than the distance from the intersection point Q1 to the bearing 43 that rotatably supports the second rotary shaft 42. That is, in the present embodiment, the first linear actuator 61 and the four-link mechanism 62, and the second linear actuator 46 are greatly apart from the intersection point Q1 between the first rotary shaft 52 and the second rotary shaft 42.

Hence, in the present embodiment, the respective actuators 61 and 46 as driving sources are not present in the vicinity of the intersection point Q1. Therefore, the mutual distance of the two mirrors 32 where the intersection point Q1 is located at the midpoint can be made small, and the moment applied to the intersection point Q1 between the first rotational axis A1 and the second rotational axis A2 when wind load is received can be made small.

Next, a setting method of the respective rotational axes A1 and A2 of the heliostats 30 described above will be described.

In an astronomical telescope, an equatorial telescope is used in order to facilitate tracking of stars, the sun, or the like. This equatorial telescope has a right-ascension axis set parallel to the earth's axis, and a declination axis perpendicular to this right-ascension axis. In this equatorial telescope, if the astronomical telescope is turned around the right-ascension axis and the declination axis and the optical axis of the astronomical telescope are first directed to a target celestial body, it is then possible to respond to the diurnal motion of the celestial body simply by turning the astronomical telescope around the right-ascension axis.

Accordingly, even in a heliostat, if a driving device of a mirror structure has two rotary shafts orthogonal to each other, the sun that makes a diurnal motion can be tracked by setting one rotary shaft to be parallel to the earth's axis and turning the mirror structure with the rotary shaft as a center. However, the heliostat needs to reflect the light from the sun that makes the diurnal motion to radiate this light to the fixed heat receiver 10. For this reason, even if one rotary shaft of the two orthogonal rotary shafts is set parallel to the earth's axis similar to the astronomical telescope, if the mirror structure is not turned around the two rotary shafts, the light from the sun that makes the diurnal motion cannot be radiated to the fixed heat receiver.

Figure 20:
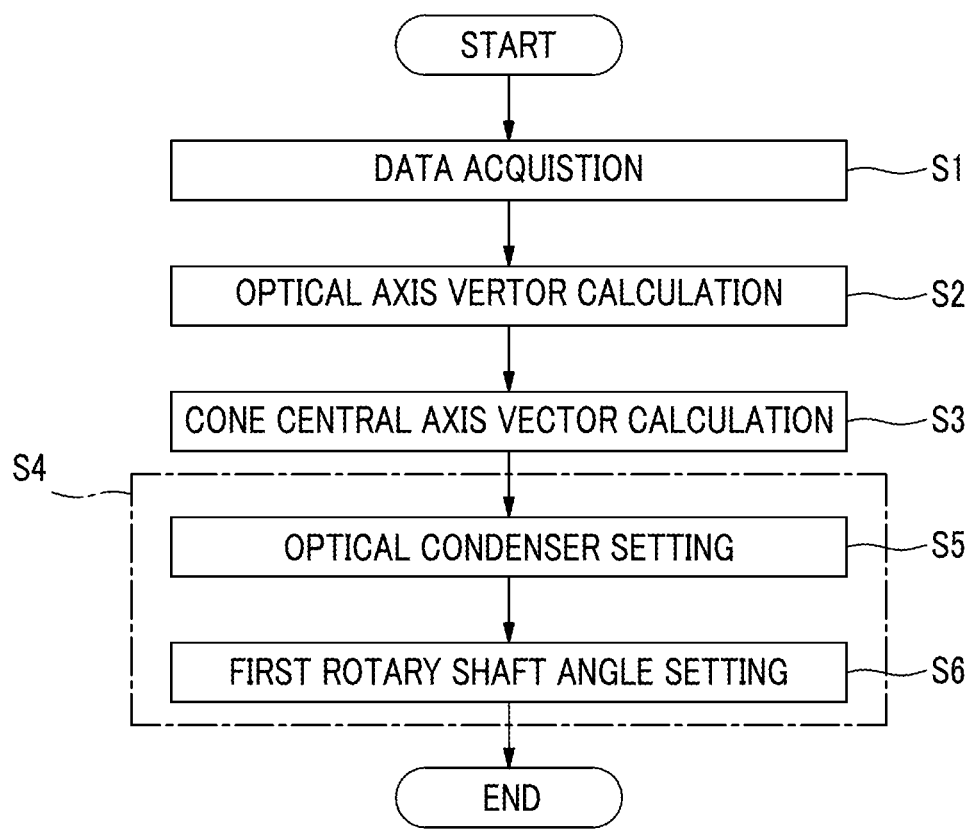
FIG. 20 is a flowchart showing a setting procedure of a rotational axis in the embodiment related to the invention.

Thus, in the following, a rotational axis setting method that can turn the mirror structure, basically, with one rotary shaft as a center to radiate the light from the sun making the diurnal motion to the fixed heat receiver 10 will be described according to the flowchart shown in FIG. 20.

Figure 21:
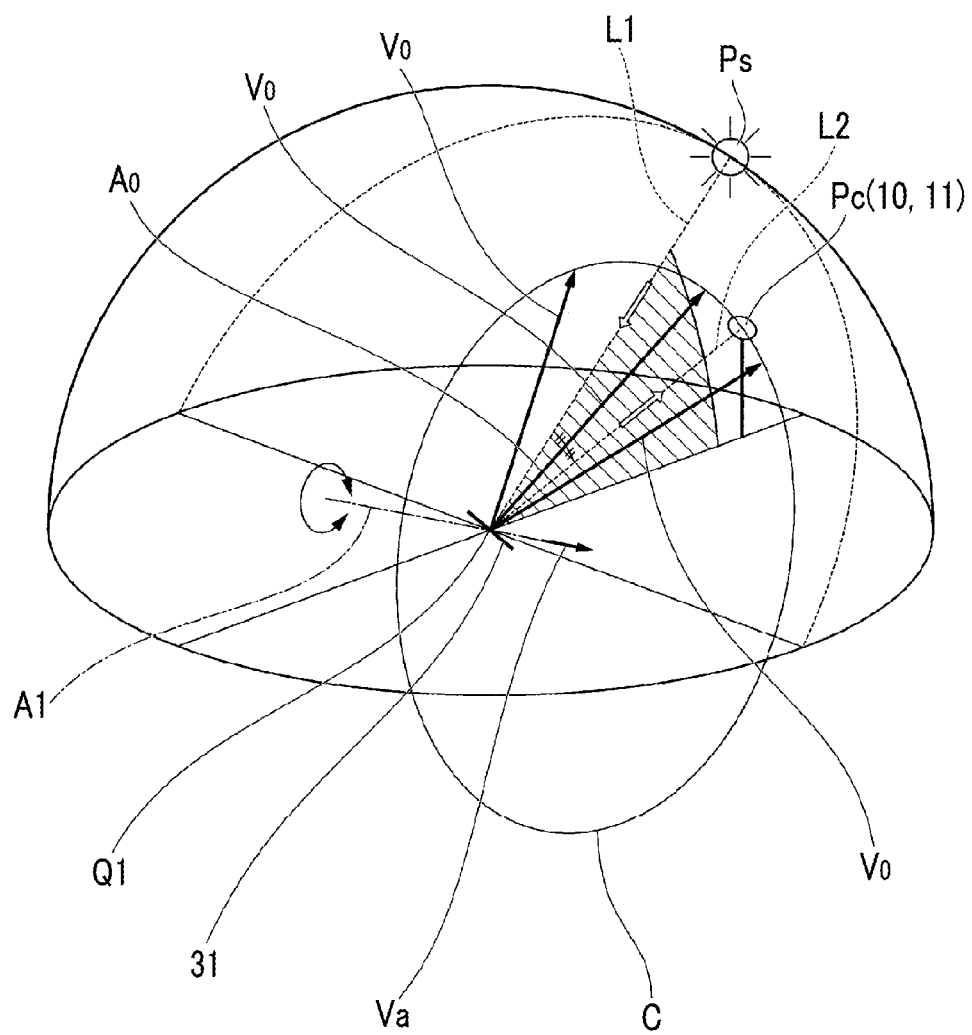
FIG. 21 is an explanatory view (Step 1) showing a setting method of a first rotational axis in the embodiment related to the invention.
Figure 22:
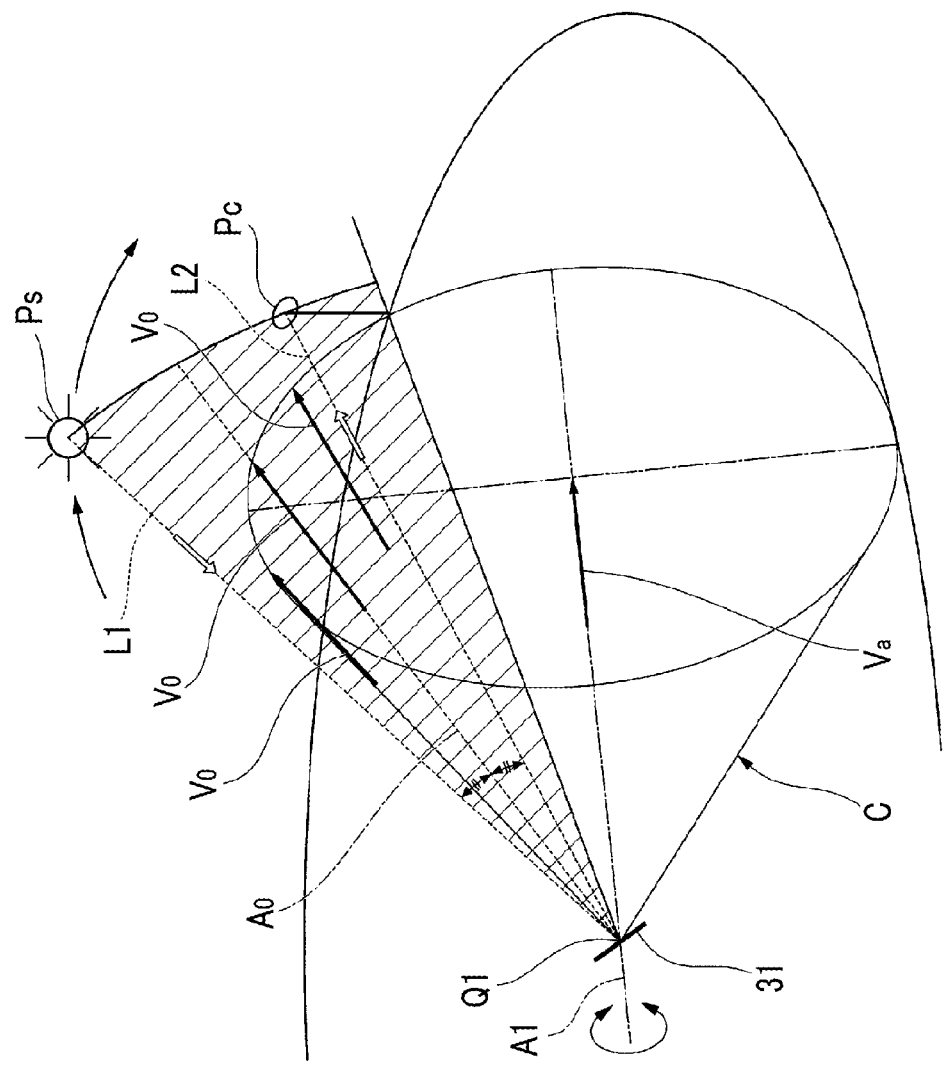
FIG. 22 is an explanatory view (Step 2) showing the setting method of the first rotational axis in the embodiment related to the invention.

First, as shown in FIGS. 21 and 22, position data on the earth where the mirror structure 31 is installed, global position data of the heat receiving part 11 of the heat receiver 10 becoming a condensed position Pc of sunlight, and solar position data based on the position of the mirror structure 31 at a plurality of times on a predetermined day in one year are acquired (S1).

The mirror structure 31 and the condensed position data are global coordinate data, that is, data shown by the latitude and the longitude. In addition, although the position data of the mirror structure 31 is precisely the position data of the principal point Q1 that is a fixed point of the mirror structure 31, since precise data is not required so much here, it is sufficient if data on positions where the heliostats 30 are installed is provided.

The solar position data based on the position of the mirror structure 31 is data shown by the azimuth of the sun Ps from the position of the mirror structure 31, and the elevation angle of the sun Ps. Additionally, the predetermined day in one year is, for example, the day of the spring equinox or the autumn equinox, or the like. Additionally, the number of the solar position data is a number that can specify the track of the sun Ps on the predetermined day, specifically, three or more.

Next, the optical axis vectors Vo indicating the direction of the optical axis Ao of the mirror structure 31 that directs the light from the sun Ps at a plurality of times on the predetermined day to the condensed position Pc are obtained for each of the plurality of times (S2). The direction of the optical axis Ao of the mirror structure 31 that directs the light from the sun Ps at a certain time to the condensed position Pc is a direction in which an angle formed between an imaginary line L1 connecting the sun Ps and the principal point Q1 of the mirror structure 31 and an imaginary line L2 connecting the principal point Q1 of the mirror structure and the condensed position Pc is bisected. In the present embodiment, a unit vector that faces this direction is defined as an optical axis vector Vo.

The track of direction segments indicated by the optical axis vectors Vo accompanying the diurnal motion of the sun Ps draws a side peripheral surface of a certain cone. That is, the track of the optical axis Ao of the mirror structure 31 that directs the light from the sun Ps making the diurnal motion to the condensed position Pc draws a side peripheral surface of a cone. Thus, next, a cone C having generatrices along which the direction segments indicated by the optical axis vectors Vo for each of the plurality of times extend is determined, and a cone central axis vector Va indicating the direction of a central axis of the cone C is obtained (S3). In addition, this cone central axis vector Va is also a unit vector.

Then, the first rotational axis A1 of the heliostat is directed to the direction indicated by the cone central axis vector Va (S4). If the direction of the first rotational axis A1 is made to coincide with the direction of the cone central axis vector Va in this way, and if the mirror structure 31 is first turned around the second rotational axis A2 so that the sunlight reflected by the mirror structure 31 is radiated to the condensed position Pc, basically, the mirror structure 31 is simply turned around the first rotational axis A1 from then, whereby the track of the direction segments indicated by the actual optical axis vectors Vo accompanying the diurnal motion of the sun Ps forms the side peripheral surface of the cone C determined in Step 3. That is, in the present embodiment, the light of the sun Ps making the diurnal motion can be radiated to the fixed condensed position Pc by causing the direction of the first rotational axis A1 to coincide with the direction of the cone central axis vector Va to thereby basically and simply turn the mirror structure 31 around the first rotational axis A1.

Figure 23:
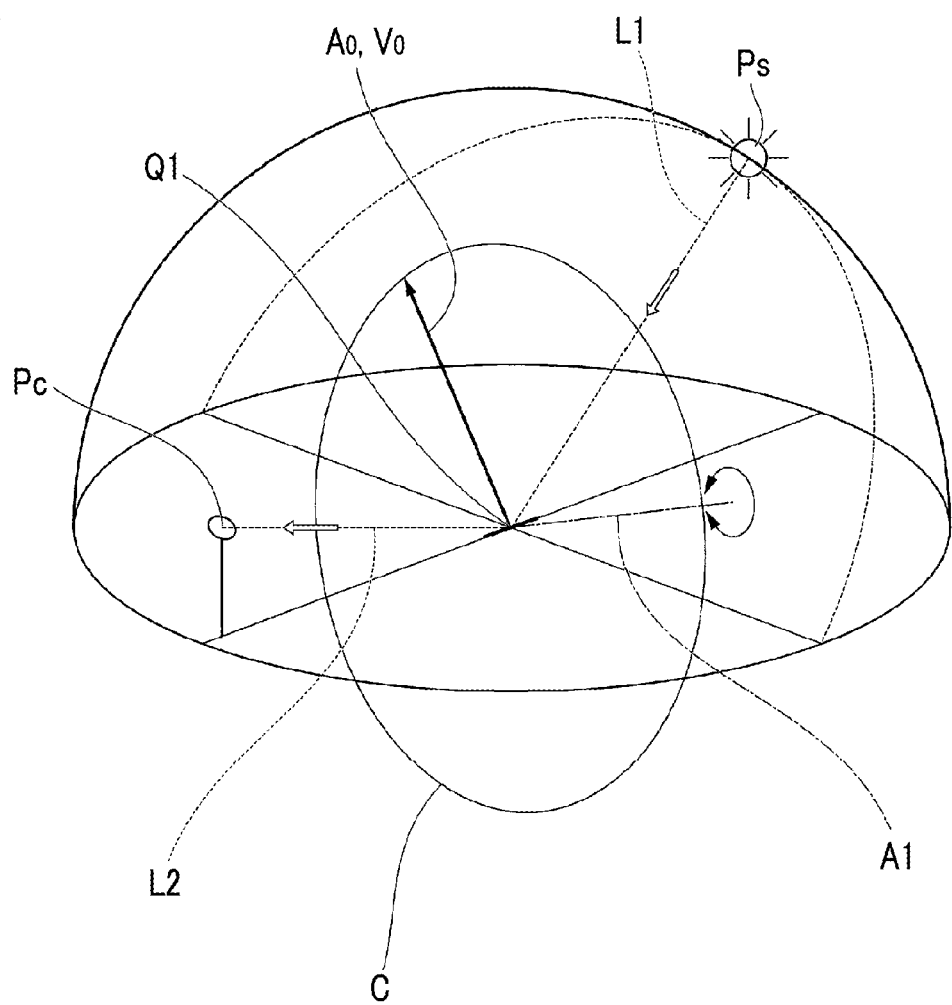
FIG. 23 is an explanatory view (Step 3) showing the setting method of the first rotational axis in the embodiment related to the invention.
Figure 24:
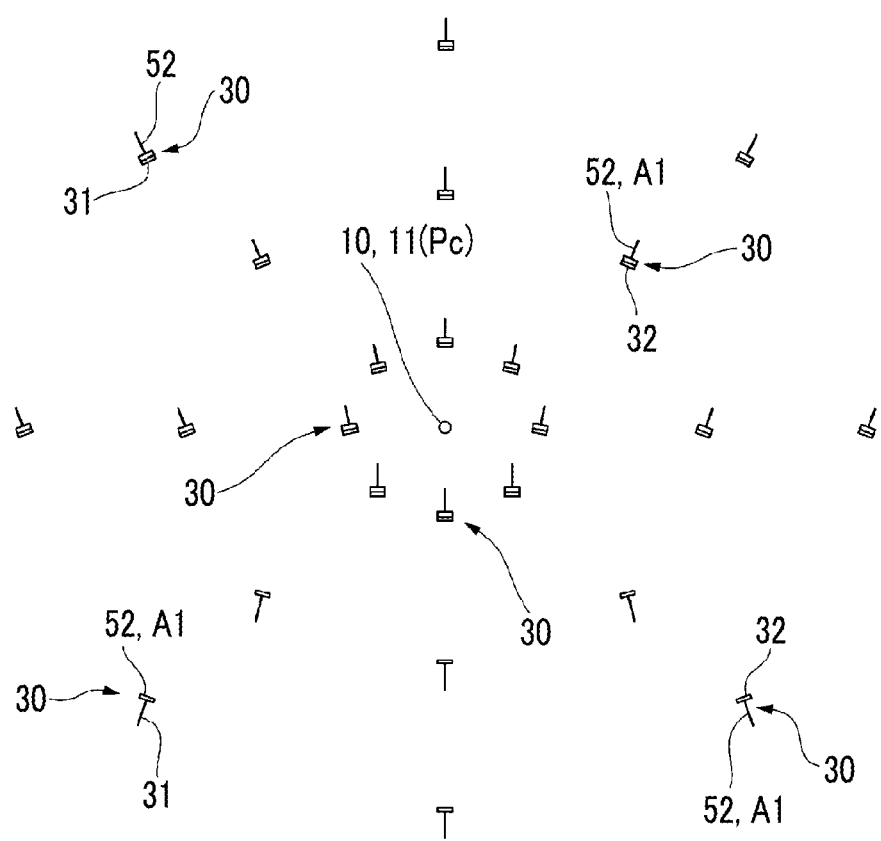
FIG. 24 is an explanatory view showing the orientation of the first rotational axis in a plurality of heliostats in the embodiment related to the invention.

Here, as mentioned above, the plurality of heliostats 30 are installed in an installation region of the heat collection apparatus. Naturally, relative positions with respect to the heat receiver 10 for each of the plurality of heliostats 30 vary. For this reason, the angles of the first rotational axes A1 with respect to the horizontal surface in the plurality of heliostats 30 vary as shown in FIGS. 21 and 23. Moreover, the orientations of the first rotational axes A1 in the plurality of heliostats 30 also vary as shown in FIG. 24. In addition, in the heliostats 30 drawn in a T-shape in FIG. 24, a portion equivalent to a horizontal line of the T-shape shows the mirror structure 31, and a portion equivalent to a vertical line of the T-shape shows the first rotary shaft 52.

For this reason, in Step 4, first, the mirror structures 31 are located at positions indicated by the position data of the mirror structure 31 acquired in Step 1, and the heliostats 30 are installed so that the orientations of the first rotational axes A1 become orientations indicated by the cone central axis vector Va (S5).

Next, the first rotational axis A1 is set so that the angle of the first rotational axis A1 with respect to the horizontal surface becomes the angle of the cone central axis vector Va with respect to the horizontal surface (S6). In this case, the angle of the first rotary shaft 52 with respect to the horizontal surface is set by operating the turnbuckle 71 of the elevation angle changing part 70.

Incidentally, in the present embodiment, the rotational angle range of the second rotary shaft 42, as mentioned above, is such that the optical axis Ao perpendicular to the second rotational axis A2 is 90° that is 90° to 180° on the basis of the first rotary shaft 52. For this reason, for example, as shown in FIG. 25A, one side A1a of the first rotational axis A1 is made equal to or lower than the other side A1b. Therefore, in the case of a downward state where the angle of the first rotational axis A1 in the counterclockwise direction with respect to the horizontal surface H is set to 340° (−20°), the orientation of the optical axis Ao can be changed within a range of 70° to 160° in the counterclockwise direction with respect to the horizontal surface H by rotating the second rotary shaft 42.

Meanwhile, when the angle of the optical axis Ao in the counterclockwise direction with respect to the horizontal surface H at which the sunlight can be radiated to the condensed position Pc is within a range of 0° to 70°, the following processing is performed in a heliostat installation step (S5) and a first rotary shaft angle setting step (S6).

In the heliostat installation step (S5), as shown in FIG. 25B, the heliostat 30 is installed so that the orientation of the one side A1a of the first rotational axis A1 with respect to the other side A1b thereof becomes an orientation reverse to the orientation when the first rotational axis is set to the aforementioned downward state.

Then, in the first rotary shaft angle setting step (S6), an upward state where the one side A1a of the first rotational axis A1 is made higher than the other side A1b and the angle of the first rotational axis A1 in the counterclockwise direction with respect to the horizontal surface H is made to be 340° (−20°) is set. That is, the one side A1a of the first rotational axis A1 is made higher than the other side A1b, and the angle of the other side A1b of the first rotational axis A1 with respect to the horizontal surface H is set to the angle of the one side A1a of the first rotational axis A1 with respect to the horizontal surface H in the downward state.

As described above, if the heliostat 30 is installed and the direction of the first rotational axis A1 is set, the orientation of the optical axis Ao can be changed within a range Rr of −20° to 70° in the counterclockwise direction with respect to the horizontal surface H by rotating the second rotary shaft 42.

In addition, as mentioned above, when the angle of the first rotary shaft 52 with respect to the horizontal surface is changed, it is possible to respond to this change by rotating the trunk frame 72 of the turnbuckle 71 to change the mutual spacing between both the screw rods 73a and 73b. Additionally, when the change range of the angle of the first rotary shaft 52 with respect to the horizontal surface is changed, it is possible to respond to this change by using different lengths of both the screw rods 73a and 73b themselves of the turnbuckle 71.

As described above, in the driving device 40 of the present embodiment, the rotational angle range of the second rotary shaft 42 is within a predetermined range on the basis of the first rotational axis A1. However, by causing the orientation of the one side A1a with respect to the other side A1b of the first rotational axis A1 to be a reverse orientation and by properly selecting whether the first rotational axis A1 is brought into the downward state or brought into the upward state, the rotational angle range of the use schedule of the second rotational axis A2 can be included within a rotational angle range to be used, of the second rotational axis A2 after the installation of the heliostat 30.

From the above, the installation of the heliostat 30 and the setting of the first rotational axis A1 are ended.

In order to radiate the sunlight to the condensed position Pc with the mirrors 32 of the heliostat 30 after the end of the installation of the heliostat 30 and the end of the setting of the first rotational axis A1, the second rotary shaft 42 is rotated so that the sunlight reflected by the mirror structure 31 is radiated to the condensed position Pc, in other words, the second rotary shaft 42 is rotated to turn the mirror structure 31 around the second rotational axis A2. In this way, if the sunlight reflected by the mirror structure 31 is made to be radiated to the condensed position Pc, as mentioned above, the light of the sun making the diurnal motion can be radiated to the fixed condensed position Pc basically and simply by turning the mirror structure 31 around the first rotational axis A1 from then.

Accordingly, in the present embodiment, a control system of the driving device 40 can be simplified, and the energy consumption thereof can be suppressed.

The elevation angle of the sun changes even at the same time of one day if the season changes. If the elevation angle of the sun changes with this seasonal change, the optical axis vector Vo at the same time of one day also changes. As a result, the cone C determined at the time of the setting of the first rotational axis A1 also changes with the seasonal change. However, the change of the cone C accompanying the seasonal change is confined to a change in the diameter of a bottom surface of the cone C, and there is no change in the direction of a central axis of the cone C. For this reason, in the present embodiment, in order to respond to the change in the elevation angle of the sun accompanying the seasonal change, the rotational angle of the second rotational axis A2 is changed, in other words, the turning angle of the mirror 32 centered on the second rotary shaft 42 is changed.

Figure 26:
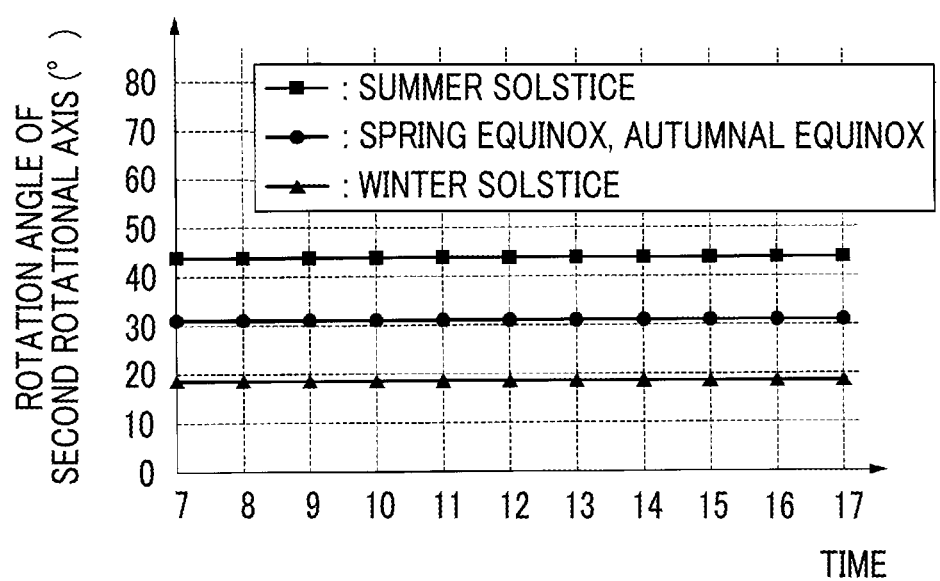
FIG. 26 is an explanatory view showing rotational angle changes of the second rotary shaft accompanying seasonal changes in the embodiment related to the invention.

Specifically, as shown in FIG. 26, the rotational angle of the second rotational axis A2 during the winter solstice and the rotational angle of the second rotational axis A2 during the summer solstice are changed with respect to the rotational angles of the second rotational axis A2 at the time of the spring equinox and the autumn equinox. Although a change in the rotational angle of the second rotational axis A2 accompanying the seasonal change may be performed every day, the change may be performed every several days. Although this change may be manually performed, the everyday rotational angles of the second rotational axis A2 are stored in the control device 2 in advance, and the second rotary shaft 42 can be automatically rotated through everyday instructions from the control device 2.

Additionally, in the above embodiment, the first rotational axis A1 and the second rotational axis A2 are orthogonal to each other, and the principal point Q1 of the mirror structure 31 is located on the intersection point between the first rotational axis A1 and the second rotational axis A2. However, if the first driving part that turns the mirrors with the first rotational axis A1 as a center and the second driving part that turns the mirrors with the second rotational axis perpendicular to the first rotational axis as a center are provided, in any type of driving device, the light of the sun making the diurnal motion can be radiated to the fixed condensed position by executing the above rotational axis setting method to thereby basically and simply turn the mirror structure around the first rotational axis.

Figure 27:
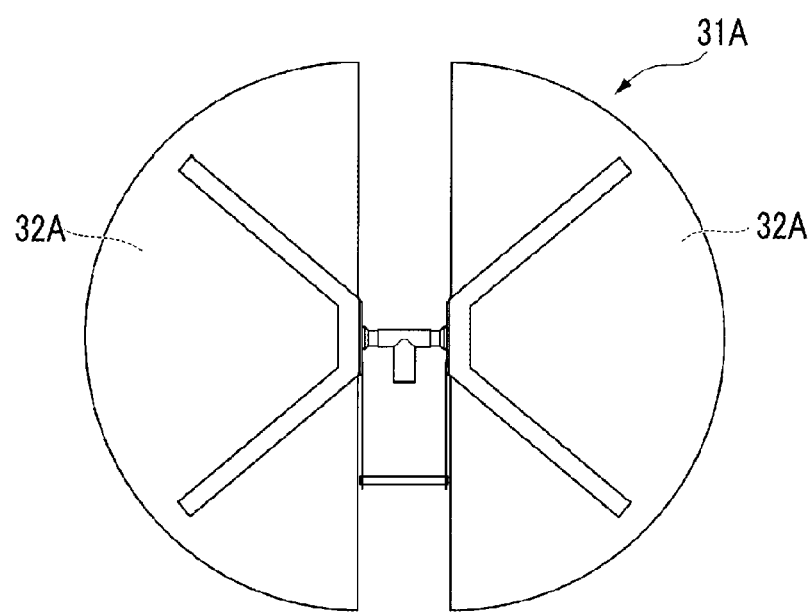
FIG. 27 is a back view of a mirror structure in a modification example of the embodiment related to the invention.

Additionally, although the mirror structure 31 having the two mirrors 32 is illustrated in the above embodiment, the invention is not limited to this and can be applied to a mirror structure having one mirror, and a mirror structure having three or more mirrors. Additionally, although the mirror structure 31 having the oblong plate-shaped mirror 32 is illustrated in the above embodiment, the invention is not limited to this, and a mirror structure 31A having a mirror 32A with other shapes, for example, a semicircular plate shape as shown in FIG. 27 may be adopted. In addition, when the semicircular plate-shaped mirror 32A is adopted, interference with an installation surface can be mitigated, and the posts can be shortened.

REFERENCE SIGNS LIST

Q1: PRINCIPAL POINT
Q2: GRAVITY CENTER
AO: OPTICAL AXIS
A1: FIRST ROTATIONAL AXIS
A2: SECOND ROTATIONAL AXIS
1: HEAT COLLECTION APPARATUS
2: CONTROL DEVICE
10: HEAT RECEIVER
11: HEAT RECEIVING PART
20: TOWER FACILITY
30: HELIOSTAT (OPTICAL CONDENSER),

31: MIRROR STRUCTURE
32: MIRROR
33: BACK REINFORCING PLATE
35: SUPPORTING FRAME
36: SUPPORTING BEAM MEMBER
37: CONNECTING MEMBER
40: DRIVING DEVICE
41: SECOND DRIVING PART
42: SECOND ROTARY SHAFT
45: SECOND DRIVE MECHANISM
46: SECOND LINEAR ACTUATOR
51: FIRST DRIVING PART
52: FIRST ROTARY SHAFT
60: FIRST DRIVE MECHANISM
61: FIRST LINEAR ACTUATOR
62: FOUR-LINK MECHANISM
63: FIRST LINK PIECE
64: SECOND LINK PIECE
65: THIRD LINK PIECE
66: FOURTH LINK PIECE
70: ELEVATION ANGLE CHANGING PART
71: TURNBUCKLE
80: SUPPORTING BASE
82: POST

The invention claimed is:

1. An optical condenser that includes a mirror structure having one or more mirrors and reflects sunlight with the mirrors of the mirror structure to condense the sunlight onto a predetermined condensed position, the optical condenser comprising:
a first driving part that turns the mirrors with a first rotational axis as a center, and
a second driving part that turns the mirrors with a second rotational axis perpendicular to the first rotational axis as a center,
wherein the first rotational axis is set to be parallel to a central axis of a cone drawn by a track of an optical axis of the mirror structure that directs the light from the sun making a diurnal motion to the condensed position.

2. The optical condenser according to claim 1,
wherein reflecting surfaces of the one or more mirrors of the mirror structure form one symmetrical plane of revolution, and a symmetrical axis of revolution of the symmetrical plane of revolution constitutes the optical axis of the mirror structure.

3. The optical condenser according to claim 1, further comprising:
an elevation angle changing part that changes an angle of the first rotational axis with respect to a horizontal surface.

4. The optical condenser according to claim 3,
wherein an angle range of the mirrors that are turned with the second rotational axis as a center in the second driving part is within a predetermined angle range on the basis of the first rotational axis, and
wherein the elevation angle changing part changes the angle of the first rotational axis with respect to the horizontal surface between a downward state where one side of the first rotational axis is made equal to or lower than the other side on the basis of the second rotational axis and an upward state where the one side is made higher than the other side.

5. A heat collection apparatus comprising:
the optical condenser according to claim 1; and
a heat receiver that heats a medium by sunlight condensed by the optical condenser.

6. A solar power generation apparatus comprising:
the optical condenser according to claim 1;
a heat receiver that heats a medium from sunlight condensed by the optical condenser;
a turbine that is driven by the medium heated by the heat receiver; and
a generator that generates electricity through the driving of the turbine.

7. A rotational axis setting method in an optical condenser including a mirror structure having one or more mirrors and a driving device that turns the mirror structure around a rotational axis to direct sunlight reflected by the mirrors of the mirror structure to a predetermined condensed position, the rotational axis setting method comprising:
a data acquisition step of acquiring global position data of the mirror structure, global position data of the condensed position, and solar position data based on the position of the mirror structure for each of a plurality of times on a predetermined day in one year;
an optical axis vector calculating step of obtaining optical axis vectors indicating a direction of an optical axis of the mirror structure that directs the light from the sun at the plurality of times on the predetermined day to the condensed position for each of the plurality of times;
a cone central axis vector calculating step of determining a cone having generatrices along which direction segments of the optical axis vectors for each of the plurality of times extend, and obtaining a cone central axis vector indicating a direction of a central axis of the cone; and
a rotational axis setting step of setting the rotational axis to be parallel to the cone central axis vector.

8. The rotational axis setting method according to claim 7,
wherein the driving device includes a first driving part that turns the mirrors with a first rotational axis as the rotational axis as a center, and a second driving part that turns the mirrors with a second rotational axis perpendicular to the first rotational axis as a center,
the setting method further comprising:
a step of changing a turning angle of the mirrors centered on the second rotational axis so as to correspond to a change in an elevation angle of the sun accompanying a diurnal change.

9. The rotational axis setting method according to claim 8,
wherein the rotational axis setting step includes:
an optical condenser installation step of installing the optical condenser so that the mirror structure is located at a position indicated by the position data of the mirror structure acquired in the data acquisition step and the orientation of the first rotational axis becomes the orientation indicated by the cone central axis vector; and
a first rotary shaft angle setting step of setting the first rotational axis so that the angle of the first rotational axis with respect to the horizontal surface becomes the angle of the cone central axis vector with respect to the horizontal surface.

10. The rotational axis setting method according to claim 9,
wherein an angle range of the mirrors that are turned with the second rotational axis as a center in the second driving part is within a predetermined angle range on the basis of the first rotational axis,
wherein, in the first rotary shaft angle setting step, the first rotational axis is set in a state where the predetermined angle range based on the first rotational axis is able to include a predetermined angle range where the mirrors are turned with the second rotational axis as a center, out of a downward state where the angle of one side of the first rotational axis with respect to the horizontal surface on the basis of the second rotational axis becomes the angle of the cone central axis vector with respect to the horizontal surface and the one side of the first rotational axis is made equal to or lower than the other side, and an upward state where the angle of the other side of the first rotational axis with respect to the horizontal surface becomes the angle of the cone central axis vector with respect to the horizontal surface and the one side of the first rotational axis is made higher than the other side, and wherein, in the optical condenser installation step, the optical condenser is installed so that the orientation of the one side of the first rotational axis with respect to the other side when the first rotational axis is set to the downward state in the first rotary shaft angle setting step, and the orientation of the one side of the first rotational axis with respect to the other side when the first rotational axis is set to the upward state become reverse orientations.

11. The optical condenser according to claim 2, further comprising:

an elevation angle changing part that changes an angle of the first rotational axis with respect to a horizontal surface.

12. A heat collection apparatus comprising:
the optical condenser according to claim 2; and
a heat receiver that heats a medium by sunlight condensed by the optical condenser.

13. A heat collection apparatus comprising:
the optical condenser according to claim 3; and
a heat receiver that heats a medium by sunlight condensed by the optical condenser.

14. A heat collection apparatus comprising:
the optical condenser according to claim 4; and
a heat receiver that heats a medium by sunlight condensed by the optical condenser.

15. A solar power generation apparatus comprising:
the optical condenser according to claim 2;
a heat receiver that heats a medium from sunlight condensed by the optical condenser;
a turbine that is driven by the medium heated by the heat receiver; and
a generator that generates electricity through the driving of the turbine.

16. A solar power generation apparatus comprising:
the optical condenser according to claim 3;
a heat receiver that heats a medium from sunlight condensed by the optical condenser;
a turbine that is driven by the medium heated by the heat receiver; and
a generator that generates electricity through the driving of the turbine.

17. A solar power generation apparatus comprising:
the optical condenser according to claim 4;
a heat receiver that heats a medium from sunlight condensed by the optical condenser;
a turbine that is driven by the medium heated by the heat receiver; and
a generator that generates electricity through the driving of the turbine.

* * * * *